US009202378B2

(12) United States Patent
Otake

(10) Patent No.: US 9,202,378 B2
(45) Date of Patent: Dec. 1, 2015

(54) DRIVING ASSISTANCE APPARATUS

(75) Inventor: Hirotada Otake, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/356,993

(22) PCT Filed: Nov. 14, 2011

(86) PCT No.: PCT/JP2011/076209
§ 371 (c)(1),
(2), (4) Date: May 8, 2014

(87) PCT Pub. No.: WO2013/072995
PCT Pub. Date: May 23, 2013

(65) Prior Publication Data
US 2014/0309903 A1    Oct. 16, 2014

(51) Int. Cl.
G06F 17/00    (2006.01)
G06F 19/00    (2011.01)
G08G 1/16    (2006.01)

(52) U.S. Cl.
CPC .................................... G08G 1/166 (2013.01)

(58) Field of Classification Search
CPC combination set(s) only.
See application file for complete search history.

(56) References Cited

U.S. PATENT DOCUMENTS 7,630,818 B2 * 12/2009 Kobayashi et al. ............. 701/96
7,672,769 B2 *  3/2010 Braeuchle et al. ............ 701/70
8,185,296 B2 *  5/2012 Yokoyama et al. .......... 701/117
2006/0293819 A1 * 12/2006 Harumoto et al. ............. 701/41
2009/0069994 A1 *  3/2009 Uechi et al. .................... 701/70
2011/0260886 A1 * 10/2011 Nagura et al. ................ 340/905

FOREIGN PATENT DOCUMENTS

| JP | 2005 173909   | 6/2005  |
| JP | 2005 174282   | 6/2005  |
| JP | 2007-200274 A | 8/2007  |
| JP | 2007 334548   | 12/2007 |
| JP | 2008 197725   | 8/2008  |
| JP | 2010 244308   | 10/2010 |
| JP | 2011 95828    | 5/2011  |
| JP | 2011 154619   | 8/2011  |

OTHER PUBLICATIONS

International Search Report Issued Feb. 21, 2012 in PCT/JP11/076209 Filed Nov. 14, 2011.

* cited by examiner

*Primary Examiner* — Thomas Tarcza
*Assistant Examiner* — Edward Pipala
(74) *Attorney, Agent, or Firm* — Oblon, McClelland, Maier & Neustadt, L.L.P.

(57)    ABSTRACT

A driving assistance apparatus includes: an assistance control apparatus that accumulates vehicle stopping position information, which is information indicating an actual stopping position, i.e. a position in which a vehicle stops, in relation to a reference stopping position, calculates an estimated variation distance between the actual stopping position and the reference stopping position on the basis of the accumulated vehicle stopping position information, and creates a target vehicle travel condition in which a timing at which to start stopping assistance is varied on the basis of the estimated variation distance; and an assistance apparatus that is capable of outputting driving assistance information to assist driving of the vehicle on the basis of a target travel condition quantity of the vehicle.

19 Claims, 12 Drawing Sheets

F I G . 12
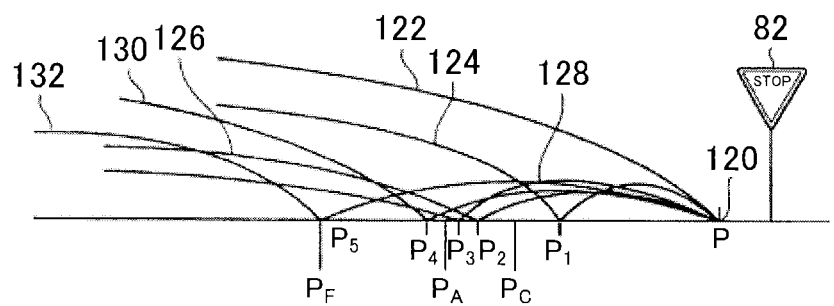

| TIME | VARIATION DISTANCE |
|---|---|
| FROM 6AM TO 10AM | 20 |
| FROM 10AM TO 2PM | 10 |
| FROM 2PM TO 4PM | 5 |
| FROM 4PM TO 6PM | 20 |
| FROM 6PM TO 10PM | 15 |
| FROM 10PM TO 6AM | 0 |

DRIVING ASSISTANCE APPARATUS

TECHNICAL FIELD

The invention relates to a driving assistance apparatus.

BACKGROUND ART

A conventional driving assistance apparatus is installed in a vehicle in order to output information for assisting a driver in driving the vehicle. Patent Document 1, for example, describes an apparatus that accumulates detection results from vehicle speed and position sensors and determines a condition of an intersection as this type of conventional driving assistance apparatus. Further, Patent Document 1 describes extracting a plurality of locations at which the vehicle speed is at a minimum within a predetermined range of the intersection, and setting an average position of the extracted positions as a target stopping position at which to stop temporarily. Patent Document 2 discloses an apparatus that notifies a driver of a point at which to start decelerating when it is necessary to stop at a traffic light on the basis of a time required to reach the traffic light and a time remaining until a color of the traffic light changes.

Patent Document 1: Japanese Patent Application Publication No. 2005-174282 (JP 2005-174282 A)

Patent Document 2: Japanese Patent Application Publication No. 2010-244308 (JP 2010-244308 A)

SUMMARY OF THE INVENTION

Incidentally, although the apparatus described in Patent Document 2 can detect a location of a temporary stop by setting a target stopping position on the basis of the accumulated detection results from the vehicle speed and position sensors, there remains room for improvement in terms of providing more appropriate driving assistance, for example. Further, although the apparatus described in Patent Document 2 provides assistance to prompt early deceleration by notifying the driver of the point at which to start decelerating when it is necessary to stop at a traffic light, there remains room for improvement in terms of providing more appropriate driving assistance, for example.

The invention has been designed in consideration of the circumstances described above, and an object thereof is to provide a driving assistance apparatus that can provide driving assistance appropriately.

To achieve the object described above, a driving assistance apparatus according to the invention assists driving of a vehicle, and includes: an assistance control apparatus that accumulates vehicle stopping position information, which is information indicating an actual stopping position in which the vehicle stops in relation to a reference stopping position, calculates an estimated variation distance between the actual stopping position and the reference stopping position on the basis of the accumulated vehicle stopping position information, and creates a target vehicle travel condition in which a timing at which stopping assistance is started is varied on the basis of the estimated variation distance; and an assistance apparatus that is capable of outputting driving assistance information to assist driving of the vehicle on the basis of a target travel condition quantity calculated by the assistance control apparatus.

Further, the assistance control apparatus preferably varies the timing at which the stopping assistance is started by determining a target stopping position on the basis of a difference between the estimated variation distance and the reference stopping position, and creating the target vehicle travel condition on the basis of the target stopping position.

Further, the assistance control apparatus preferably varies the timing at which the stopping assistance is started by correcting a target vehicle speed at the start of a brake operation on the basis of the estimated variation distance, and creating the target vehicle travel condition on the basis of the corrected target vehicle speed at the start of the brake operation.

Further, the estimated variation distance is preferably a distance from a position of an average value of the actual stopping positions to an actual stopping position furthest from the reference stopping position.

Further, the estimated variation distance is preferably a distance from a position of a median value of the actual stopping positions to a location furthest from the reference stopping position.

Further, the assistance control apparatus preferably sets the target stopping position in a position shifted, by the estimated variation distance, to a position closer to the vehicle than is the reference stopping position.

Further, the driving assistance apparatus preferably further includes preceding vehicle detecting means for detecting a preceding vehicle traveling in front of the vehicle in an advancement direction of the vehicle, and when the preceding vehicle detecting means detects a preceding vehicle, the assistance control apparatus preferably advances the timing at which the stopping assistance is started.

Further, when the preceding vehicle detecting means detects a preceding vehicle, the assistance control apparatus preferably shifts the target stopping position to the position closer to the vehicle than is the reference stopping position.

Further, the assistance control apparatus preferably classifies the information indicating the actual stopping positions into set time patterns, calculates the estimated variation distance for each of the patterns, and creates the target vehicle travel condition on the basis of the estimated variation distance of the time pattern in which a creation time of the target vehicle travel condition is classified.

Further, the assistance apparatus preferably performs assistance to prompt a recommended driving operation by outputting the driving assistance information.

Further, the driving assistance information preferably includes information instructing cancelation of an acceleration request operation and a braking request operation.

Further, the driving assistance information preferably includes information instructing starting of the braking request operation.

The driving assistance apparatus according to the invention is capable of providing driving assistance appropriately.

BRIEF DESCRIPTION OF THE DRAWINGS

FIG. 12 is an illustrative view showing examples of stopping patterns of the vehicle.

MODES FOR CARRYING OUT THE INVENTION

Embodiments of the invention will be described in detail below on the basis of the drawings. Note that the invention is not limited to these embodiments. Further, constituent elements of the following embodiments include elements that could be replaced easily by a person skilled in the art or substantially identical elements.

[First Embodiment]

Figure 1:
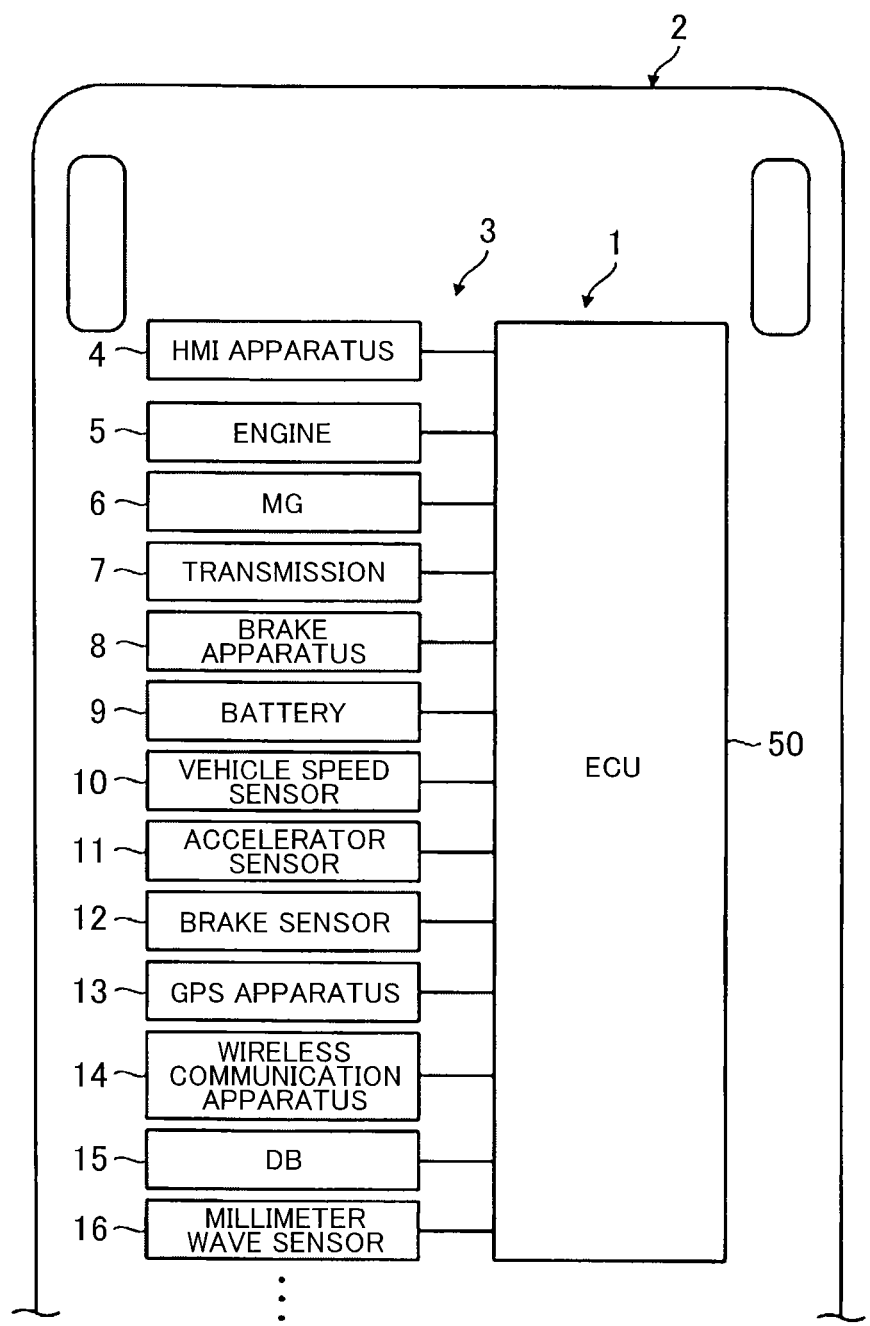
FIG. 1 is a schematic view showing a configuration of a vehicle control system.
Figure 2:
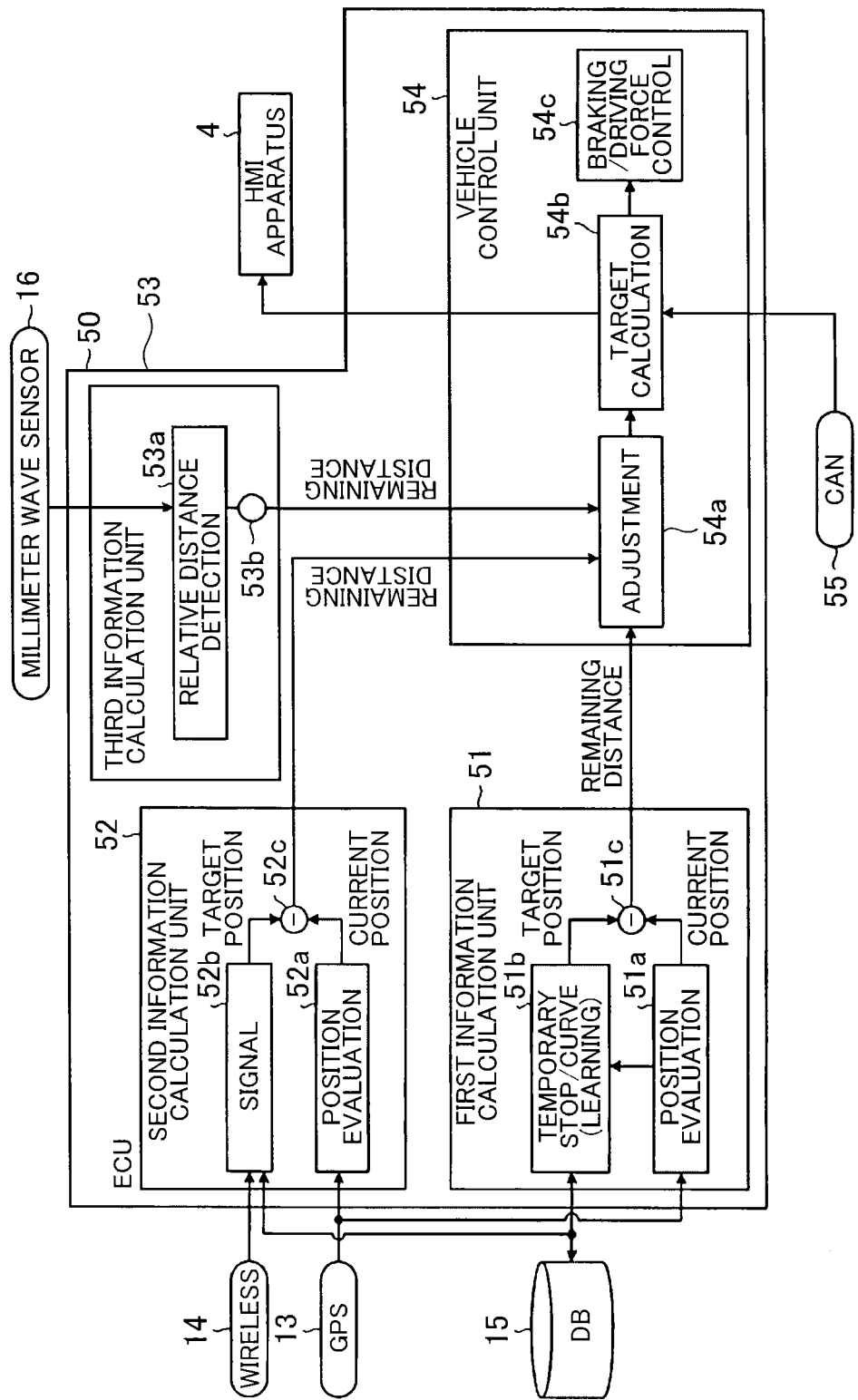
FIG. 2 is a schematic block diagram showing an example of a configuration of an electronic control unit (ECU).
Figure 3:
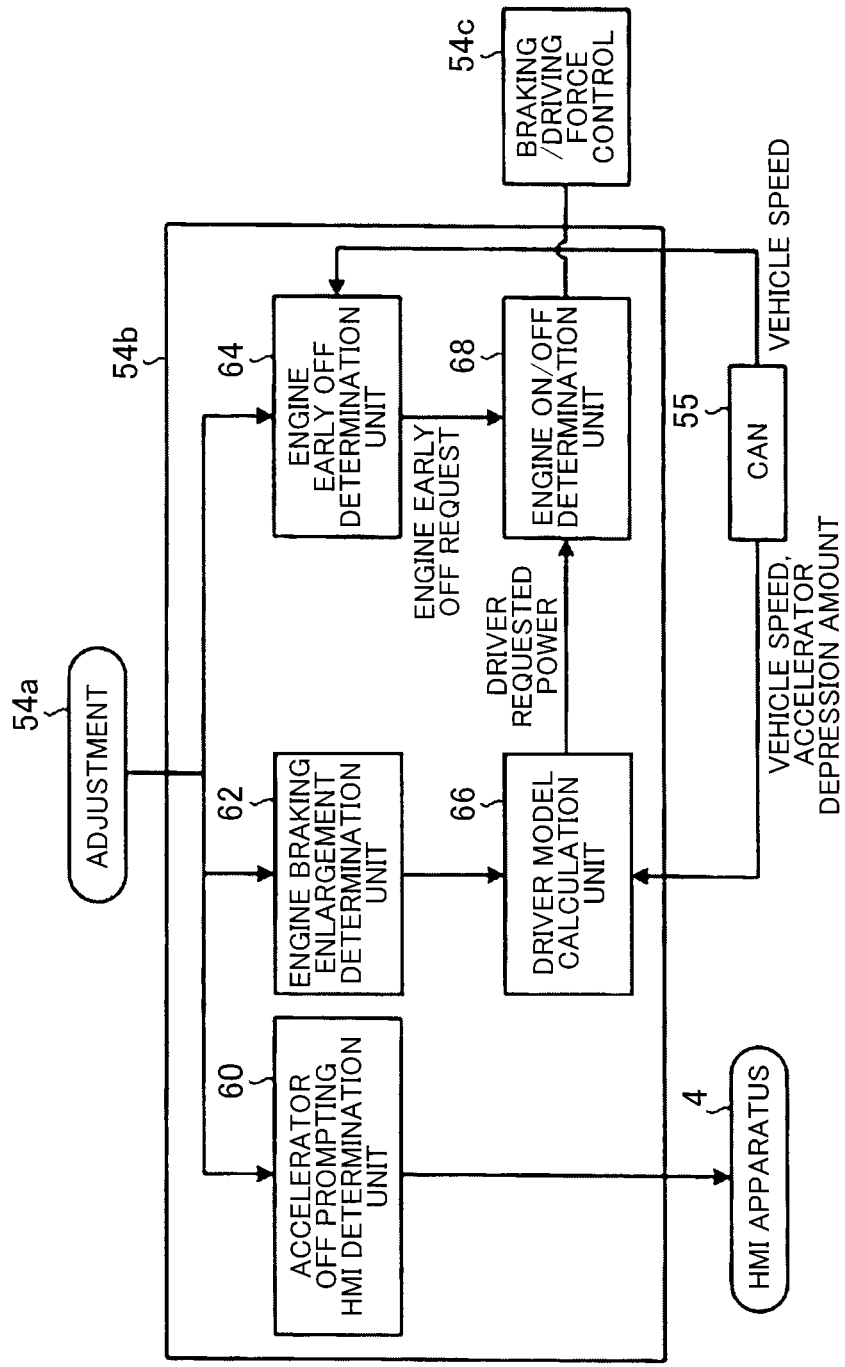
FIG. 3 is a schematic block diagram showing an example of a configuration of a target calculation unit.

FIG. 1 is a schematic view showing a configuration of a vehicle control system according to a first embodiment, FIG. 2 is a schematic block diagram showing an example of a configuration of an ECU according to the first embodiment, and FIG. 3 is a schematic block diagram showing an example of a configuration of a target calculation unit.

As shown in FIG. 1, a driving assistance apparatus 1 according to this embodiment is applied to a vehicle control system 3 installed in a vehicle 2. The driving assistance apparatus 1 includes a human machine interface (HMI) apparatus (also referred to hereafter as an "HMI") 4 serving as an assistance apparatus, and an ECU 50. The driving assistance apparatus 1 assists a driver in driving the vehicle 2 by having the ECU 50 control the HMI apparatus 4 in accordance with conditions to output various types of driving assistance information.

The vehicle control system 3 to which the driving assistance apparatus 1 according to this embodiment is applied is a read-ahead information eco-driving assistance system that utilizes so-called read-ahead information. In other words, the vehicle control system 3 utilizes read-ahead information to cause the driving assistance apparatus 1 to provide assistance to prompt the driver to perform driving operations having a superior fuel efficiency improvement effect, and in so doing, assists the driver in performing eco-driving. Hence, the vehicle control system 3 is a system configured to suppress fuel consumption and thereby achieve an improvement in fuel efficiency. The driving assistance apparatus 1 typically provides assistance to prompt an operation by the driver by outputting driving assistance information with the aim of assisting the driver in performing eco-driving.

Further, the vehicle control system 3 according to this embodiment is a so-called hybrid system in which a travel drive source for driving a drive wheel of the vehicle 2 to rotate is constituted by a combination of an engine 5 and a motor generator (MG) 6. In other words, the vehicle 2 is a hybrid vehicle including the MG 6 as a travel drive source in addition to the engine 5. The vehicle 2 is configured to realize an improvement in fuel efficiency by operating the engine 5 in a maximum efficiency condition, compensating for deficiency and excess in an amount of power and an engine braking force using the MG 6, which is a rotating electric machine, and regenerating energy during deceleration.

Note that although the vehicle control system 3 will be described below as a hybrid system including the engine 5 and the MG 6 as travel drive sources, the vehicle control system 3 is not limited thereto and may be a system that includes the engine 5 as a travel drive source but does not include the MG 6, or a system that includes the MG 6 as a travel drive source but does not include the engine 5. In other words, the vehicle 2 may be a so-called conventional vehicle or a so-called EV (electric vehicle).

More specifically, the vehicle control system 3 is configured to include the HMI apparatus 4, the engine 5, which is constituted by an internal combustion engine, the MG 6, which is constituted by a motor, a transmission 7, a brake apparatus 8, a battery 9, and so on. The vehicle control system 3 also includes a vehicle speed sensor 10, an accelerator sensor 11, a brake sensor 12, a global positioning system (GPS) apparatus (also referred to hereafter as a "GPS") 13, a wireless communication apparatus 14, a database (DB) 15, a millimeter wave sensor 16, and so on.

The HMI apparatus 4 is an assistance apparatus capable of outputting driving assistance information, which is information used to assist driving of the vehicle 2. The HMI apparatus 4 provides the driver with the driving assistance information and so on. The HMI apparatus 4 is an in-vehicle device, and includes a display apparatus (a visual information display apparatus), a speaker (an audio output apparatus), and so on provided in a cabin of the vehicle 2, for example. Existing apparatuses such as a display apparatus, a speaker, and so on of a navigation (NAVI) system, for example, may be used as is as the HMI apparatus 4. The HMI apparatus 4 prompts the driver to perform a driving operation by providing information such as voice information and visual information (pictorial information and alphabetical information) so that an improvement in fuel efficiency can be achieved. By providing this information, the HMI apparatus 4 assists the driver in achieving target values through his/her driving operations. The HMI apparatus 4 is electrically connected to the ECU 50 and controlled by the ECU 50. Note that the HMI apparatus 4 may be configured to include a sensory information output apparatus or the like that outputs sensory information such as steering wheel vibration, seat vibration, a pedal reaction force, and so on, for example.

The engine 5, the MG 6, the transmission 7, the brake apparatus 8, the battery 9, and so on are installed in the vehicle control system 3 as various actuators for realizing travel by the vehicle 2.

The engine 5 causes a driving force to act on a wheel of the vehicle 2 in response to an acceleration request operation, for example an accelerator pedal depression operation, performed by the driver. The engine 5 consumes fuel to generate engine torque that serves as travel power applied to a drive wheel of the vehicle 2. In other words, the engine 5 is a heat engine that outputs thermal energy generated by burning fuel in the form of mechanical energy such as torque, and may be constituted by a gasoline engine, a diesel engine, a liquefied petroleum gas (LPG) engine, or the like, for example. The engine 5 includes, for example, a fuel injection apparatus, an ignition apparatus, a throttle valve apparatus, and so on, not shown in the drawings, and these apparatuses are electrically connected to the ECU 50 so as to be controlled by the ECU 50. An output torque from the engine 5 is controlled by the ECU 50. Note that the power generated by the engine 5 may be used during power generation by the MG 6.

The MG 6 causes a driving force to act on the wheel of the vehicle 2 in response to the acceleration request operation, for example the accelerator pedal depression operation, performed by the driver. The MG 6 converts electric energy into mechanical power to generate motor torque that serves as the travel power applied to the drive wheel of the vehicle 2. The MG 6 is a so-called rotating electric machine having a stator as a fixed element and a rotor as a rotary element. The MG 6 is both a motor that converts electric energy into mechanical power and outputs the mechanical power, and a power generator that converts mechanical power into electric energy and collects the electric energy. In other words, the MG 6 functions as both a motor that is driven by a supply of power to convert electric energy into mechanical energy and output the mechanical energy (a power running function), and a power generator that converts mechanical energy into electric energy (a regenerative function). The MG 6 is electrically connected to the ECU 50 via an inverter or the like that performs conversion between a direct current and an alternating current, and is thus controlled by the ECU 50. An output torque and a power generation amount of the MG 6 are controlled by the ECU 50 via the inverter.

The transmission 7 is a power transmission apparatus that speed-shifts a rotary output generated by the engine 5 and the MG 6 and transmits the speed-shifted rotary output to the drive wheel side of the vehicle 2. The transmission 7 may be a so-called manual transmission (MT), or a so-called automatic transmission (AT) such as a stepped AT, a continuously variable transmission (CVT), a multimode manual transmission (MMT), a sequential manual transmission (SMT), or a dual clutch transmission (DCT). It is assumed in the following description that the transmission 7 is a CVT employing a planetary gear mechanism and so on, for example. A transmission actuator or the like of the transmission 7 is electrically connected to the ECU 50 such that the transmission 7 is controlled by the ECU 50.

The brake apparatus 8 causes a braking force to act on the wheel of the vehicle 2 in response to a braking request operation, for example a brake pedal depression operation, performed by the driver. The brake apparatus 8 applies the braking force to the wheel, which is supported rotatably on a vehicle body of the vehicle 2, by generating a predetermined frictional force (a frictional resistance force) between friction elements such as brake pads or brake discs, for example. In so doing, the brake apparatus 8 generates a braking force on a ground contact surface of the vehicle wheel of the vehicle 2, i.e. a surface of the vehicle wheel that contacts a road surface, and as a result, braking can be applied to the vehicle 2. A brake actuator or the like of the brake apparatus 8 is electrically connected to the ECU 50 such that the brake apparatus 8 is controlled by the ECU 50.

The battery 9 is a storage apparatus capable of storing power (storage) and discharging the stored power. The battery 9 is electrically connected to the ECU 50 in order to output signals relating to various types of information to the ECU 50.

When the MG 6 functions as a motor, the power stored in the battery 9 is supplied thereto via the inverter, whereupon the MG 6 converts the supplied power into travel power for the vehicle 2 and outputs the travel power. When the MG 6 functions as a power generator, on the other hand, the MG 6 is driven by input power to generate power and charge the battery 9 with the generated power via the inverter. At this time, braking (regenerative braking) can be applied to rotation of the rotor of the MG 6 using rotational resistance generated in the rotor. During the regenerative braking, therefore, regenerative motor torque, which is negative motor torque, can be generated in the rotor of the MG 6 through power regeneration, and as a result, a braking force can be applied to the drive wheel of the vehicle 2. In other words, in the vehicle control system 3, mechanical power is input into the MG 6 from the drive wheel of the vehicle 2, causing the MG 6 to generate power by regeneration, and as a result, kinetic energy of the vehicle 2 can be collected as electric energy. Further, in the vehicle control system 3, the mechanical power (the negative motor torque) generated in the rotor of the MG 6 during the operation described above can be transmitted to the drive wheel, and as a result, regenerative braking can be performed by the MG 6. In this case, the braking force generated in the vehicle control system 3 decreases relatively as a regeneration amount (a power generation amount) of the MG 6 is relatively reduced, and as a result, a degree of deceleration acting on the vehicle 2 decreases relatively. On the other hand, the braking force generated in the vehicle control system 3 increases relatively as the regeneration amount (the power generation amount) of the MG 6 is relatively increased, and as a result, the degree of deceleration acting on the vehicle 2 increases relatively.

The vehicle speed sensor 10, the accelerator sensor 11, and the brake sensor 12 are condition detection apparatuses that detect travel conditions of the vehicle 2 and input (driver input) that is input into the vehicle 2 by the driver, or in other words condition quantities and physical quantities relating to actual operations performed by the driver on the vehicle 2. The vehicle speed sensor 10 detects a speed (also referred to as the "vehicle speed" hereafter) of the vehicle 2. The accelerator sensor 11 detects an accelerator opening, i.e. an operation amount (a depression amount) of the accelerator pedal by the driver. The brake sensor 12 detects an operation amount (a depression amount) of the brake pedal by the driver, for example a master cylinder pressure or the like. The vehicle speed sensor 10, the accelerator sensor 11, and the brake sensor 12 are electrically connected to the ECU 50 in order to output detection signals to the ECU 50.

The GPS apparatus 13 is an apparatus that detects a current position of the vehicle 2. The GPS apparatus 13 receives a GPS signal output by a GPS satellite, and on the basis of the received GPS signal, measures/calculates GPS information (X coordinate; X, Y coordinate; Y) serving as information indicating the position of the vehicle 2. The GPS apparatus 13 is electrically connected to the ECU 50 in order to output a signal relating to the GPS information to the ECU 50.

The wireless communication apparatus 14 is a read-ahead information acquisition apparatus that obtains read-ahead information relating to travel by the vehicle 2 using wireless communication. For example, the wireless communication apparatus 14 uses wireless communication to obtain the read-ahead information from an apparatus that exchanges information using a communication infrastructure such as the Internet via a road-to-vehicle communication device (a roadside device) such as an optical beacon disposed on a roadside, a vehicle-to-vehicle communication device installed in another vehicle, a vehicle information and communication system (VICS) (registered trademark) center, or the like. As the read-ahead information, the wireless communication apparatus 14 obtains, for example, preceding vehicle information, following vehicle information, traffic light information, works/traffic restriction information, congestion information, emergency vehicle information, information relating to an accident history DB, and so on. The traffic light information includes, for example, information indicating a position of a traffic light ahead of the vehicle 2 in a travel direction, light cycle information indicating an illumination cycle, a light switch timing, and so on of a green light, a yellow light, and a red light, and so on. The wireless communication apparatus 14 is electrically connected to the ECU 50 in order to output signals relating to the read-ahead information to the ECU 50.

The DB 15 stores various information. The DB 15 stores map information including road information, various information and learned information obtained during actual travel by the vehicle 2, the read-ahead information obtained by the wireless communication apparatus 14, and so on. The road information includes, for example, road gradient information, road surface condition information, road shape information, speed limit information, road curvature (curve) information, temporary stop information, stop line position information, and so on. The information stored in the DB 15 is referred to appropriately by the ECU 50, whereupon required information is read. Note that here, as shown in the drawing, the DB 15 is installed in the vehicle 2, but the invention is not limited thereto, and the DB 15 may be provided in an information center or the like outside the vehicle 2. In this case, the DB 15 is referred to appropriately by the ECU 50 via wireless communication or the like, whereupon the required information is read. As the learned information, the DB 15 according to this embodiment accumulates information indicating a position (an actual stopping position) in which the vehicle 2 stops at a traffic light, an intersection, or the like provided with a reference stopping position such as a stop line. The DB 15 accumulates the actual stopping position information for each reference stopping position.

The millimeter wave sensor 16 is a sensor that measures an inter-vehicle distance between a host vehicle and a preceding vehicle (a vehicle ahead of the vehicle 2). The millimeter wave sensor 16 emits millimeter waveband radio waves frontward from the vehicle 2 such that the emitted radio waves are reflected by an object (the preceding vehicle, i.e. a frontward vehicle), and receives the returning radio waves. The millimeter wave sensor 16 calculates the distance to the frontward vehicle by comparing an output condition of the emitted radio waves with a detection result of the received radio waves. The millimeter wave sensor 16 may also detect a distance to an obstruction in front of the host vehicle. The millimeter wave sensor 16 transmits information indicating the calculated distance to the frontward vehicle to the ECU 50. Note that in this embodiment, the millimeter wave sensor 16 is used as a sensor that measures the inter-vehicle distance between the host vehicle and the preceding vehicle (the vehicle ahead of the vehicle 2), but various sensors capable of measuring a distance to an object in front of the vehicle 2 may be used instead. For example, the vehicle 2 may employ a laser radar sensor in place of the millimeter wave sensor 16.

The ECU 50 is a control unit that performs overall control of the vehicle control system 3, and is constituted, for example, by an electronic circuit having a conventional microcomputer including a central processing unit (CPU), a read only memory (ROM), a random access memory (RAM), and an interface as a main body. Electric signals corresponding to detection results obtained by the vehicle speed sensor 10, the accelerator sensor 11, the brake sensor 12, and the millimeter wave sensor 16, the GPS information obtained by the GPS apparatus 13, the read-ahead information obtained by the wireless communication apparatus 14, the various information stored in the DB 15, drive signals relating to respective components, control commands, and so on are input into the ECU 50. The ECU 50 controls the HMI apparatus 4, the engine 5, the MG 6, the transmission 7, the brake apparatus 8, the battery 9, and so on in accordance with the input electric signals and so on. For example, the ECU 50 executes drive control on the engine 5, drive control on the MG 6, shift control on the transmission 7, braking control on the braking apparatus 8, and the like on the basis of the accelerator depression amount, the vehicle speed, and so on. Further, for example, the ECU 50 realizes various types of vehicle travel (travel modes) in the vehicle 2 by employing the engine 5 and the MG 6 either together or selectively in accordance with operating conditions.

Furthermore, for example, the ECU 50 can detect an ON/OFF condition of an accelerator operation serving as the acceleration request operation performed on the vehicle 2 by the driver on the basis of the detection result obtained by the accelerator sensor 11. Similarly, for example, the ECU 50 can detect an ON/OFF condition of a brake operation serving as the braking request operation performed on the vehicle 2 by the driver on the basis of the detection result obtained by the brake sensor 12. Note that when the accelerator operation performed by the driver is in an OFF condition, this means that the driver has canceled the acceleration request operation in relation to vehicle 2, and when the accelerator operation performed by the driver is in an ON condition, this means that the driver is performing the acceleration request operation on the vehicle 2. Similarly, when the brake operation performed by the driver is in an OFF condition, this means that the driver has canceled the braking request operation in relation to the vehicle 2, and when the brake operation performed by the driver is in an ON condition, this means that the driver is performing the braking request operation on the vehicle 2.

As described above, the driving assistance apparatus 1 is configured to include the HMI apparatus 4 and the ECU 50. In addition to the HMI apparatus 4 and the ECU 50, the driving assistance apparatus 1 may include various sensors for detecting vehicle conditions and various information acquisition units for supplying peripheral information. The driving assistance apparatus 1 provides assistance to prompt the driver to perform driving operations having a superior fuel efficiency improvement effect by having the ECU 50 control the HMI apparatus 4 in accordance with conditions such that various types of driving assistance information are output. The driving assistance apparatus 1 provides prompting assistance to prompt the driver to perform a recommended driving operation, which is typically a driving operation performed in response to a change, on the basis of a target travel condition quantity of the vehicle 2 during travel by causing the HMI apparatus 4 to output the various types of driving assistance information in accordance with the control executed by the ECU 50. Here, the target travel condition quantity of the vehicle 2 is typically a target travel condition quantity of the vehicle 2 during travel at a predetermined location or a predetermined timing. The driving assistance apparatus 1 provides assistance to prompt the driver to perform the recommended driving operation by having the ECU 50 control the HMI apparatus 4 on the basis of the target travel condition quantity at the predetermined location or the predetermined timing such that the HMI apparatus 4 outputs the driving assistance information, and in so doing, the driving assistance apparatus 1 provides driving assistance with which the travel condition quantity of the vehicle 2 reaches the target travel condition quantity at the predetermined location and the predetermined timing.

When the vehicle 2 is to be stopped in a stopping position at a traffic light, an intersection, or the like, the driving assistance apparatus 1 according to this embodiment varies (shifts) a target stopping position from a reference stopping position (a position of a stop line) on the basis of various conditions. More specifically, the driving assistance apparatus 1 calculates an estimated variation distance (also referred to as a variation distance) Y, and sets a position shifted, by the calculated estimated variation distance, to a position closer to the vehicle 2 (a position closer to a current position of the vehicle 2) than is the reference stopping position, as the target stopping position.

The driving assistance apparatus 1 determines the target travel condition quantity, which is a predetermined travel condition in a predetermined position, on the basis of the varied target stopping position. The driving assistance apparatus 1 then outputs the driving assistance information on the basis of the target travel condition. Note that the driving assistance apparatus 1 according to this embodiment outputs the driving assistance information to the HMI apparatus 4 as visual information. Here, a target brake operation starting vehicle speed, i.e. a recommended vehicle speed at which the driver is recommended to perform the brake operation (the braking request operation) may be cited as an example of the target travel condition quantity. Further, an operation performed by the driver to switch the accelerator operation OFF (i.e. an operation to cancel the acceleration request operation) may be cited as an example of the recommended driving operation which the driving assistance apparatus 1 prompts the driver to perform. The driving assistance apparatus 1 displays the visual information serving as the driving assistance information in the form of an image on a visual information display apparatus such as a center meter, a head-up display (HUD), a display superimposed onto a front windshield, or a liquid crystal display constituting the HMI apparatus 4, for example.

The vehicle 2 outputs information instructing the driver to perform the operation for switching the accelerator operation OFF as the driving assistance information, thereby causing the driver to execute the operation for switching the accelerator operation OFF in a predetermined position. As a result, the vehicle speed substantially reaches the target brake operation starting vehicle speed in the predetermined location. When the vehicle speed substantially reaches the target brake operation starting vehicle speed in the predetermined location, the driver starts the brake operation in the predetermined position where the target brake operation starting vehicle speed is reached, and as a result, the vehicle 2 can be stopped smoothly in the vicinity of the target stopping position. Hence, the driving assistance information is output such that the vehicle 2 stops appropriately in the target stopping position corresponding to the various conditions. The driving assistance apparatus 1 thus realizes appropriate driving assistance in which a sense of discomfort experienced by the driver during driving assistance is suppressed.

An example of a configuration of the ECU 50 will be described in outline below with reference to the block diagram of FIG. 2. As shown in FIG. 2, the ECU 50 is configured to include a first information calculation unit 51, a second information calculation unit 52, a third information calculation unit 53, and a vehicle control unit 54. The first information calculation unit 51, second information calculation unit 52, and third information calculation unit 53 are intelligent transport systems (ITS) compatible calculation units, for example, which are used to perform infrastructure cooperation and NAVI cooperation. The vehicle control unit 54 is a control unit that controls respective parts of the vehicle 2. The vehicle control unit 54 is connected via a control area network (CAN) 55, which is constructed as an in-vehicle network, to an actuator ECU and various sensors for controlling various actuators such as an engine control ECU, an MG control ECU, a transmission control ECU, a brake control ECU, and a battery control ECU. The vehicle control unit 54 obtains control values of the various actuators and detection values from the sensors as vehicle information via the CAN 55. Note that the ECU 50 is not limited to this configuration, and may be configured to include a NAVI apparatus instead of the first information calculation unit 51, for example.

The first information calculation unit 51 calculates a remaining distance to a temporary stop or a curve in front of the vehicle 2 in the travel direction on the basis of static infrastructure information, for example the map information including the road information and so on. Further, the first information calculation unit 51 learns and predicts deceleration/stopping behavior of the driver by learning usual driving behavior of the driver and estimating driving behavior on the basis thereof. The first information calculation unit 51 also calculates a remaining distance to a deceleration/stopping position in front of the vehicle 2 in the travel direction. Here, the deceleration/stopping position obtained by learning the usual driving behavior of the driver is a position other than a temporary stop or the like in which the driver decelerates and stops frequently, for example.

Note that the first information calculation unit 51 may learn the deceleration/stopping behavior of the driver on the basis of various information obtained while the vehicle 2 actually travels, or in other words may learn a deceleration/stopping position corresponding to the driver. For example, on the basis of various information obtained while the vehicle 2 actually travels, the first information calculation unit 51 learns habits and tendencies of driving operations performed by the driver during normal driving in association with the person (driver attributes, for example), the location (the position in which the operation is performed and so on, for example), the conditions (the time and so on, for example), and so on. For example, the first information calculation unit 51 learns temporary stops, deceleration/stopping positions in which the driver frequently decelerates and stops, and so on by performing statistical processing in relation to the ON/OFF condition of the accelerator operation and the brake operation performed by the driver, and so on. The first information calculation unit 51 stores the learned information in the DB 15 as learned information.

The first information calculation unit 51 includes, as basic functions, a position evaluation unit 51a, a temporary stop/curve information acquisition unit 51b, and a subtractor 51c. The position evaluation unit 51a obtains information indicating the current position of the vehicle (the host vehicle) 2 by obtaining the GPS information via the GPS apparatus 13. The position evaluation unit 51a outputs the current position information to the temporary stop/curve information acquisition unit 51b and the subtractor 51c. The temporary stop/curve information acquisition unit 51b refers to the map information, the various information obtained as the vehicle 2 actually travels, and the learned information stored in the DB 15 on the basis of the current position information input from the position evaluation unit 51a to obtain target position information indicating a temporary stop, a curve, or a deceleration/stopping position in front of the vehicle 2 in the travel direction. The temporary stop/curve information acquisition unit 51b outputs the target position information to the subtractor 51c. The subtractor 51c calculates a difference between a position of the vehicle 2 indicated by the current position information input from the position evaluation unit 51a and the temporary stop, curve, or deceleration/stopping position indicated by the target position information input from the temporary stop/curve information acquisition unit 51b, and in so doing calculates a remaining distance to the temporary stop, curve, or deceleration/stopping position. The subtractor 51*c* outputs remaining distance information indicating the remaining distance to an adjustment unit 54*a* of the vehicle control unit 54.

Further, the first information calculation unit 51 determines whether or not the estimated variation distance Y has been set by the temporary stop/curve information acquisition unit 51*b* in relation to the subject temporary stop or deceleration/stopping position. When the first information calculation unit 51 determines that the estimated variation distance Y has been set by the temporary stop/curve information acquisition unit 51*b* in relation to the subject temporary stop or deceleration/stopping position, the target position information indicating a target stopping position is moved to the position closer to the vehicle 2 than is a reference stopping position on the basis of a value of the estimated variation distance Y. The reference stopping position includes the position of a stop line of the subject temporary stop and deceleration/stopping position. The first information calculation unit 51 then calculates the remaining distance using the varied target stopping position as a reference. Note that information indicating the estimated variation distance Y may be stored in the DB 15 in advance. Further, a method of setting the estimated variation distance Y will be described below.

The second information calculation unit 52 calculates a remaining distance to a stopping position for a red light in front of the vehicle 2 in the travel direction on the basis of dynamic infrastructure information, for example the traffic light information and so on.

The second information calculation unit 52 includes, as basic functions, a position evaluation unit 52*a*, a traffic light information acquisition unit 52*b*, and a subtractor 52*c*. The position evaluation unit 52*a* obtains information indicating the current position of the vehicle (the host vehicle) 2 by obtaining the GPS information via the GPS apparatus 13. The position evaluation unit 52*a* outputs the current position information to the subtractor 52*c*. The traffic light information acquisition unit 52*b* obtains the traffic light information via the wireless communication apparatus 14, and obtains target position information indicating a red light stopping position in front of the vehicle 2 in the travel direction on the basis of the traffic light information. The traffic light information acquisition unit 52*b* outputs the target position information to the subtractor 52*c*. The subtractor 52*c* calculates a difference between the position of the vehicle 2 indicated by the current position information input from the position evaluation unit 52*a* and the red light stopping position indicated by the target position information input from the traffic light information acquisition unit 52*b*, and in so doing calculates a remaining distance to the red light stopping position. The subtractor 52*c* outputs remaining distance information indicating the remaining distance to the adjustment unit 54*a* of the vehicle control unit 54.

Further, the second information calculation unit 52 determines whether or not the estimated variation distance Y has been set by the traffic light information acquisition unit 52*b* in relation to the subject red light stopping position (the position of a stop line corresponding to the traffic light). When the second information calculation unit 52 determines that the estimated variation distance Y has been set by the traffic light information acquisition unit 52*b* in relation to the subject red light stopping position, the target position information indicating a target stopping position is moved to the position closer to the vehicle 2 than is a reference stopping position on the basis of the value of the estimated variation distance Y. The reference stopping position includes the position of the stop line corresponding to the traffic light. The second information calculation unit 52 then calculates the remaining distance using the varied target stopping position as a reference. Note that information indicating the estimated variation distance Y may be stored in the DB 15 in advance. Further, a method of setting the estimated variation distance Y will be described below.

The third information calculation unit 53 includes, as basic functions, a relative distance detection unit 53*a* and a conversion unit 53*b*. The relative distance detection unit 53*a* obtains the detection result of the millimeter wave sensor 16. The relative distance detection unit 53*a* detects the presence of a preceding vehicle from the detection result of the millimeter wave sensor 16, and when a preceding vehicle exists, detects a relative distance to the preceding vehicle. The conversion unit 53*b* creates information for adjusting the remaining distance from information indicating the relative distance to the preceding vehicle, calculated by the relative distance detection unit 53*a*. More specifically, when the relative distance to the preceding vehicle is shorter than a set distance, the conversion unit 53*b* creates remaining distance adjustment information including an instruction to shorten the remaining distance. When the relative distance to the preceding vehicle equals or exceeds the set distance, the conversion unit 53*b* creates remaining distance adjustment information including an instruction to maintain the remaining distance as is. In other words, the conversion unit 53*b* creates remaining distance adjustment information including an instruction either to maintain the remaining distance as is or to shorten the remaining distance on the basis of the relative distance to the preceding vehicle. Note that the conversion unit 53*b* may output the relative distance to the preceding vehicle as is to the vehicle control unit 54.

The vehicle control unit 54 performs overall control of the HMI apparatus 4 and a braking/driving force applied to the vehicle 2 on the basis of the information indicating the remaining distance to the temporary stop, curve, or deceleration/stopping position calculated by the first information calculation unit 51, the remaining distance to the red light stopping position calculated by the second information calculation unit 52, and the relationship to the preceding vehicle calculated by the third information calculation unit 53, as well as a vehicle speed Vx of the vehicle 2, the ON/OFF condition of the accelerator operation, the ON/OFF condition of the brake operation, the accelerator depression amount, and so on.

The vehicle control unit 54 includes, as basic functions, the adjustment unit 54*a*, a target calculation unit 54*b*, and a braking/driving force control unit 54*c*. The adjustment unit 54*a* adjusts the information indicating the remaining distance to the temporary stop, curve, or deceleration/stopping position, input from the subtractor 51*c*, the information indicating the remaining distance to the red light stopping position, input from the subtractor 52*c*, and the remaining distance adjustment information based on the relationship to the preceding vehicle, input from the conversion unit 53*b*. For example, the adjustment unit 54*a* adjusts the remaining distance information on the basis of an accuracy of the remaining distance information, a magnitude relationship of the remaining distance, and so on, and outputs an adjustment result to the target calculation unit 54*b*. Here, when stopping assistance is provided, the adjustment unit 54*a* determines a stopping assistance subject basically by adjusting the remaining distance information input from the subtractor 51*c* and the remaining distance information input from the subtractor 52*c*. In other words, the adjustment unit 54*a* determines whether the vehicle 2 is to be stopped in a stopping position of a temporary stop such as an intersection not having a traffic light, or a stopping position of a traffic light that has turned red, and determines the remaining distance accordingly. Furthermore, the adjustment unit 54a creates remaining distance information to be output to the target calculation unit 54b by adjusting the determined remaining distance on the basis of the remaining distance adjustment information based on the relationship to the preceding vehicle, input from the conversion unit 53b.

The target calculation unit 54b calculates the target travel condition quantity on the basis of the remaining distance information adjustment result input from the adjustment unit 54a, the vehicle speed Vx of the vehicle 2 input from the vehicle speed sensor 10 via the CAN 55, and so on. The target calculation unit 54b then controls the HMI apparatus 4 and the braking/driving force control unit 54c on the basis of the target travel condition quantity.

Referring to a block diagram shown in FIG. 3, an example of a configuration of the target calculation unit 54b will be described in outline. As shown in FIG. 3, the target calculation unit 54b includes an accelerator OFF prompting HMI determination unit 60, an engine braking enlargement determination unit 62, an engine early OFF determination unit 64, a driver model calculation unit 66, and an engine ON/OFF determination unit 68. The accelerator OFF prompting HMI determination unit 60 calculates a timing at which assistance is provided to prompt the accelerator operation OFF operation using the HMI apparatus 4 on the basis of the target travel condition quantity, and controls the HMI apparatus 4 to output the driving assistance information in accordance therewith.

The engine braking enlargement determination unit 62 calculates a magnitude of engine braking to be generated on the basis of the target travel condition quantity. In other words, the engine braking enlargement determination unit 62 calculates, on the basis of the target travel condition quantity, a magnitude of engine braking required to decelerate the vehicle 2 to a speed at which the brake operation is switched ON in a predetermined location following the accelerator operation OFF operation. On the basis of the calculated engine braking magnitude, the engine braking enlargement determination unit 62 calculates a number of regenerative engine braking operations to be performed by the MG 6 in addition to normal engine braking and the like and a time zone of the regenerative engine braking operations. The engine braking enlargement determination unit 62 transmits a calculation result to the driver model calculation unit 66.

The engine early OFF determination unit 64 calculates a timing at which to switch an output of the engine 5 OFF on the basis of the target travel condition quantity. In other words, the engine early OFF determination unit 64 determines, on the basis of the target travel condition quantity, whether or not it is necessary to switch the output of the engine 5 OFF, or in other words to establish a condition in which engine braking is performed, in order to decelerate the vehicle 2 to the speed at which the brake operation is switched ON in the predetermined location following the accelerator operation OFF operation. After determining that it is necessary to switch the engine 5 OFF, the engine early OFF determination unit 64 outputs an engine early OFF request to the engine ON/OFF determination unit 68 when the calculated timing arrives.

The driver model calculation unit 66 calculates a driver requested power on the basis of the vehicle speed and the accelerator depression amount, obtained via the CAN 55, and the calculation result output by the engine braking enlargement determination unit 62. The driver model calculation unit 66 calculates a target driving condition on the basis of the calculation result from the engine braking enlargement determination unit 62, and detects an actual driving condition via the CAN 55. The driver model calculation unit 66 then outputs information indicating the output of the engine 5, which is calculated on the basis of a difference between the target driving condition and the actual driving condition, to the engine ON/OFF determination unit 68 as the driver requested power. Here, the driver model calculation unit 66 may output a condition required to realize the target driving condition as the driver requested power, or may output a condition required to approach a driving condition based on the accelerator depression amount as the driver requested power.

The engine ON/OFF determination unit 68 determines the driving condition of the engine 5 on the basis of the engine early OFF request output from the engine early OFF determination unit 64, and the driver requested power. On the basis of the determination result, the engine ON/OFF determination unit 68 determines whether to switch the engine 5 ON or OFF, or in other words whether or not to perform engine braking in the engine 5. The engine ON/OFF determination unit 68 outputs the determination result to the braking/driving force control unit 54c.

When the accelerator operation OFF operation is actually performed by the driver, the braking/driving force control unit 54c performs braking/driving force control to adjust an actual deceleration of the vehicle 2 to a prescribed accelerator OFF deceleration. More specifically, the braking/driving force control unit 54c controls the deceleration generated by engine braking by controlling the ON/OFF condition of the engine 5 on the basis of the control executed by the target calculation unit 54. Further, the vehicle control system 3 is a hybrid system, and therefore, to ensure that the deceleration reaches the prescribed accelerator OFF deceleration, the braking/driving force control unit 54c executes regenerative engine braking enlargement control to cause the MG 6 to perform regenerative engine braking in addition to the normal engine braking and so on. The regenerative engine braking resulting from the regenerative engine braking enlargement control is less affected by an amount of heat generated during regeneration and so on than the regenerative braking corresponding to the brake operation ON operation performed by the driver, described above, and therefore a regeneration efficiency thereof tends to be relatively high. Hence, by having the driving assistance apparatus 1 provide assistance to prompt the driver to perform the accelerator operation OFF operation at an appropriate timing, the vehicle control system 3 can secure a comparatively long period for executing the regenerative engine braking enlargement control, and as a result, a superior fuel efficiency improvement effect can be expected.

Figure 4:
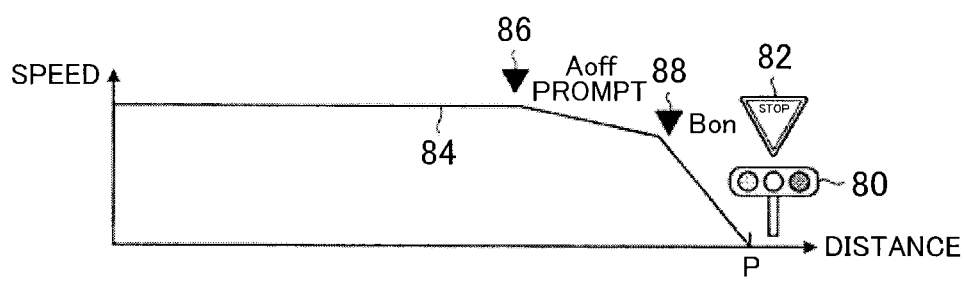
FIG. 4 is a schematic view showing a relationship between a remaining distance to a stopping position and a vehicle speed.
Figure 5:
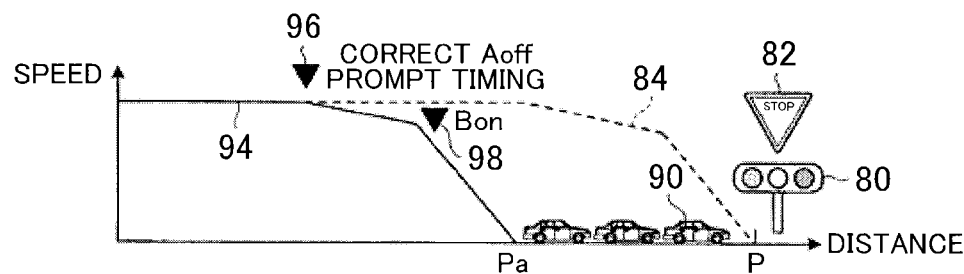
FIG. 5 is a schematic view showing the relationship between the remaining distance to the stopping position and the vehicle speed.

Next, referring to FIGS. 4 to 7, an example of the processing executed by the driving assistance apparatus 1 according to this embodiment will be described. FIGS. 4 and 5 are schematic views respectively showing a relationship between the remaining distance to the stopping position and the vehicle speed. As shown in FIG. 4, when the driving assistance apparatus 1 detects that the vehicle 2 has arrived at a location of a red traffic light 80 or a temporary stop sign 82, the driving assistance apparatus 1 sets a location P of a stop line corresponding to the traffic light 80 or the sign 82 as the target stopping position, and then provides stopping assistance. More specifically, as shown by a deceleration pattern 84 in FIG. 4, the driving assistance apparatus 1 calculates a deceleration pattern enabling the vehicle 2 to stop in the location P, and determines an accelerator OFF prompting point 86 and a brake ON prompting point 88 with which to realize the deceleration pattern 84. The accelerator OFF prompting point 86 is a timing at which an image prompting the driver to switch the accelerator OFF is displayed. The brake ON prompting point 88 is a timing at which an image prompting the driver to switch the brake ON, or in other words to execute the brake operation, is displayed. The driving assistance apparatus 1 calculates a timing at which various aims, such as stopping the vehicle 2 appropriately in a target stopping location, applying braking at an appropriate degree of deceleration and an appropriate braking distance, and generating power through regenerative engine braking, can be realized to a high level as the accelerator OFF prompting point 86. Further, the driving assistance apparatus 1 may calculate the deceleration pattern 84, the accelerator OFF prompting point 86, and the brake ON prompting point 88 as target travel condition quantities, or calculate the accelerator OFF prompting point 86 and the brake ON prompting point 88 as target travel condition quantities.

When the current position and the current vehicle speed are determined to correspond to the calculated accelerator OFF prompting point 86 and brake ON prompting point 88, the driving assistance apparatus 1 displays an image corresponding to the appropriate operation on the HMI apparatus 4. In consideration of a time required to execute the operation following display of the image, the accelerator OFF prompting point 86 and the brake ON prompting point 88 may be set by the driving assistance apparatus 1 at a predetermined amount of time before a desired operation start time. By outputting the driving assistance information on the basis of target travel condition quantities such as the calculated deceleration pattern 84, accelerator OFF prompting point 86, and brake ON prompting point 88 in this manner, the driving assistance apparatus 1 can assist a stopping operation in which the vehicle 2 can be decelerated in a pattern corresponding to the deceleration pattern 84 so as to stop appropriately in the target stopping location, braking can be applied at an appropriate degree of deceleration and an appropriate braking distance, and power can be generated through regenerative engine braking.

As shown in FIG. 4, when no other vehicle exists between the host vehicle and the location P of the stop line, the driving assistance apparatus 1 sets the stop line as the target stopping position, calculates a target travel condition quantity required to stop the host vehicle in the target stopping position, and outputs driving assistance information based on the target travel condition quantity. In so doing, the host vehicle can be stopped at the stop line while realizing a favorable deceleration pattern. When, however, another vehicle is stopped at the location P of the stop line, as shown in FIG. 5, an actual stopping position is a location Pa. In the case shown in FIG. 5, a favorable deceleration pattern is not obtained when the driving assistance apparatus 1 provides stopping assistance using the location P of the stop line as the target stopping position. Therefore, when stopping assistance corresponding to the deceleration pattern 84 is executed such that the driver switches the accelerator OFF in accordance with the assistance, the driver must ultimately decelerate the host vehicle at a high degree of deceleration.

In response to this problem, the driving assistance apparatus 1 calculates the estimated variation distance Y in relation to each stopping position, shifts the target stopping position to the position closer to the vehicle 2 than is the actual stopping position on the basis of the calculated estimated variation distance Y, and sets the location Pa as the target stopping position. By setting the location Pa as the target stopping position, the driving assistance apparatus 1 can calculate a deceleration pattern 94, an accelerator OFF prompting point 96, and a brake ON prompting point 98 at which the host vehicle can be stopped favorably in the location Pa. As will be described below, the estimated variation distance Y is not obtained by calculating a current actual stopping position using an actual measurement value from a sensor or the like, and therefore the target stopping position may be a different location to the location Pa. Nevertheless, the target stopping position can be brought closer to the location Pa than when the location P is maintained as the target stopping position.

Figure 6:
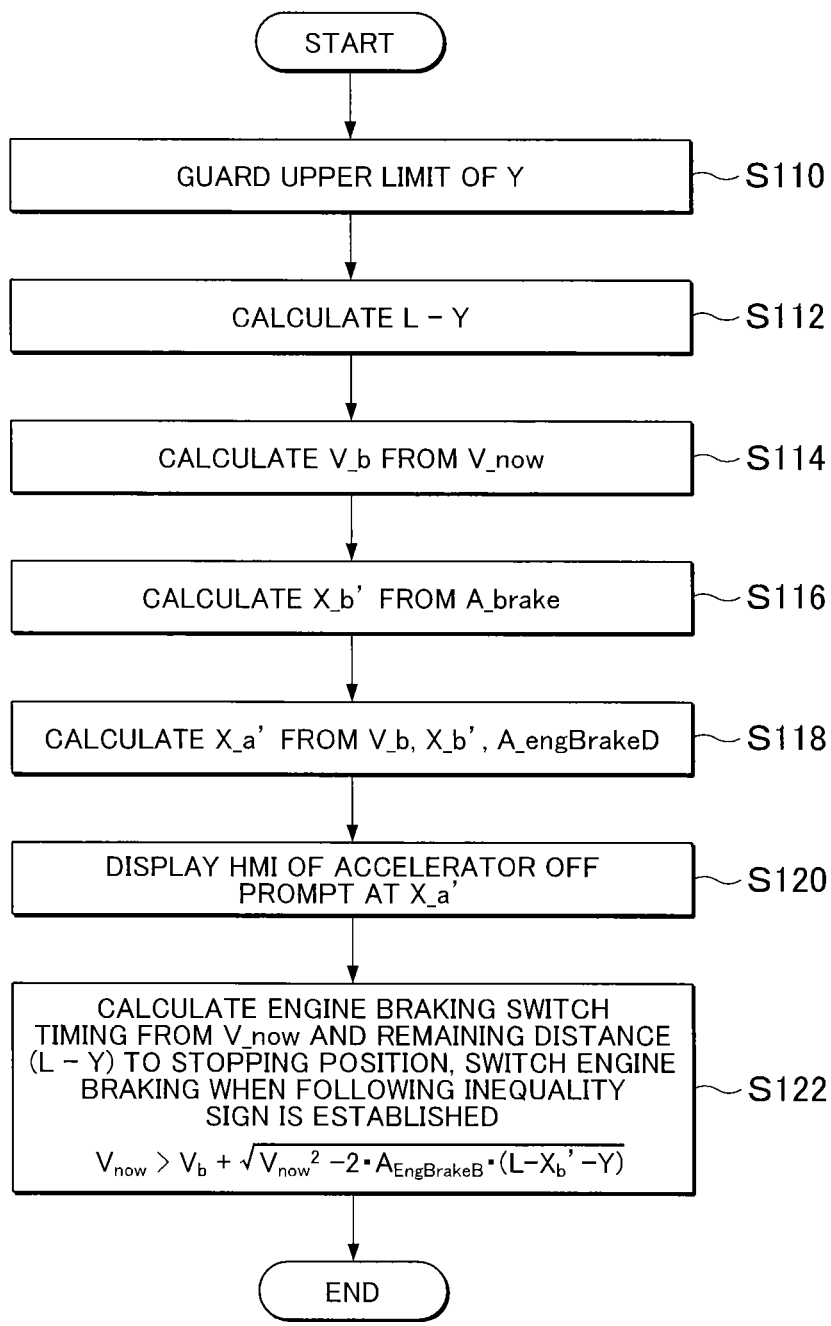
FIG. 6 is a flowchart showing an example of control executed by the ECU.
Figure 7:
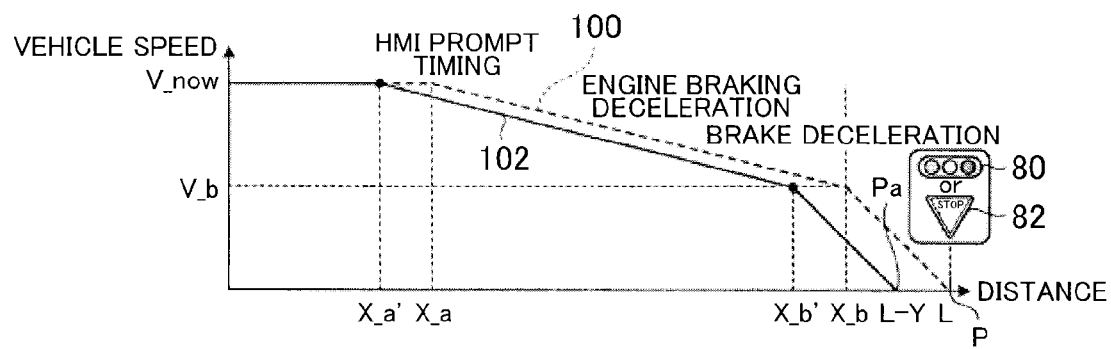
FIG. 7 is a schematic view showing an example of the relationship between the remaining distance to the stopping position and the vehicle speed and types of assistance in the vehicle control system.

Stopping assistance using the estimated variation distance will be described below using FIGS. 6 and 7. FIG. 6 is a flowchart showing an example of control executed by the ECU. FIG. 7 is a schematic view showing an example of the relationship between the remaining distance to the stopping position and the vehicle speed and types of assistance in the vehicle control system. As shown in FIGS. 6 and 7, first, in step S110, the target calculation unit 54b guards an upper limit of the estimated variation distance Y. In other words, the target calculation unit 54b reads the estimated variation distance Y relating to the reference stopping position and determines whether or not the read estimated variation distance Y exceeds an upper limit value. When the estimated variation distance Y exceeds the upper limit value, the target calculation unit 54b sets the estimated variation distance Y at the upper limit value. By guarding the upper limit of the estimated variation distance Y in this manner, the estimated variation distance Y becomes shorter than a distance of X_b from the reference stopping position. Here, X_b is a position serving as the brake ON prompting point in a case where the reference stopping position is set as the target stopping position.

After guarding the upper limit value in step S110, the target calculation unit 54b calculates L−Y in step S112. Here, a distance L is a distance from a current location to the location P serving as the reference stopping position. Accordingly, the target calculation unit 54b sets a position of L−Y, or in other words a position shifted, by the variation distance Y, to the position closer to the vehicle 2 than is the reference stopping position, as the target stopping location.

After calculating L−Y in step S112, the target calculation unit 54b calculates a target brake operation vehicle speed V_b in step S114 on the basis of a current vehicle speed (an entrance vehicle speed) V_now of the vehicle 2. The target calculation unit 54b calculates the target brake operation starting vehicle speed V_b by multiplying the vehicle speed V_now by a predetermined vehicle speed coefficient. The vehicle speed coefficient is set such that the target brake operation starting vehicle speed V_b is a speed at which, when the brake operation ON operation is performed, the vehicle 2 can arrive in the stopping position without causing the driver of the vehicle 2 and a driver of a following vehicle to experience stress caused by either rapid braking or an excessively low vehicle speed.

Next, after setting the target brake operation starting vehicle speed V_b in step S114, the target calculation unit 54b calculates a target brake operation starting position X_b', which serves as a predetermined location, in step S116 on the basis of a preset target brake deceleration A_brake. The target calculation unit 54b calculates the target brake operation starting position X_b' on the basis of the target brake operation starting vehicle speed V_b and the target brake deceleration A_brake using a target stopping position (a location removed from the current location by the distance L−Y) corresponding to the remaining distance adjusted by the adjustment unit 54a as a reference position. In other words, the target calculation unit 54b back-calculates a brake operation starting position at which, when the vehicle 2 traveling at the target brake operation starting vehicle speed V_b is decelerated by the target brake deceleration A_brake through a brake operation, the vehicle 2 can be stopped in the target stopping position, and sets the calculation result as the target brake operation starting position X_b'.

The target brake deceleration A_brake is set in advance at a fixed value corresponding to a degree of deceleration at which the driver does not feel that braking generated in response to the brake operation ON operation is excessively rapid, for example. Here, since the vehicle control system 3 is a hybrid system, the target brake deceleration A_brake is also preferably set at a degree of deceleration having a slight margin relative to a regeneration upper limit deceleration at which regeneration can be performed efficiently by the MG 6. In other words, the target brake deceleration A_brake is preferably set such that the degree of deceleration requested by the driver through the brake operation corresponds to a degree of deceleration that can be satisfied by the regenerative braking performed by the MG 6. In this case, when the degree of deceleration requested by the driver through the brake operation is equal to or smaller than the target brake deceleration, the hybrid vehicle control system 3 can stop the vehicle 2 in the stopping position through the regenerative braking performed by the MG 6 without relying on friction braking by the brake apparatus 8. In this case, the vehicle control system 3 can collect the kinetic energy of the vehicle 2 as electric energy efficiently through regenerative braking corresponding to the brake operation performed by the driver rather than consuming the kinetic energy of the vehicle 2 as thermal energy through friction braking, and as a result, a superior fuel efficiency improvement effect can be expected.

After determining the target brake operation starting position X_b' in step S116, the target calculation unit 54b calculates an accelerator OFF prompting position X_a' in step S118 on the basis of the target brake operation starting vehicle speed V_b, the target brake operation starting position X_b', and a preset prescribed accelerator OFF deceleration A_engBrake.

The accelerator OFF deceleration A_engBrake is a degree of deceleration of the vehicle 2 in a condition where the accelerator operation and the brake operation are both OFF. The accelerator OFF deceleration A_engBrakeD is set in advance at a fixed value on the basis of an engine braking torque generated by rotational resistance in the engine 5, a TM braking torque generated by rotational resistance in the transmission 7, and in the hybrid system according to this embodiment, a regenerative motor torque corresponding to a regeneration amount of the MG 6 and so on, for example.

The target calculation unit 54b calculates the accelerator OFF prompting position X_a' on the basis of the accelerator OFF deceleration A_engBrakeD and the target brake operation starting vehicle speed V_b using the target brake operation starting position X_b' as a reference position. In other words, the target calculation unit 54b back-calculates an accelerator operation OFF position at which, when the vehicle 2 is decelerated by the accelerator OFF deceleration A_engBrakeD, the vehicle speed of the vehicle 2 can reach the target brake operation starting vehicle speed V_b in the target brake operation starting position X_b', and sets the calculation result as the accelerator OFF prompting position X_a'.

After calculating the accelerator OFF prompting position X_a' in step S118, the target calculation unit 54b starts processing for outputting the driving assistance information using the HMI apparatus 4. In step S120, the target calculation unit 54b outputs driving assistance information relating to accelerator OFF prompting assistance to the HMI apparatus 4 at a timing at which the vehicle 2 reaches the accelerator OFF prompting position X_a' at the current vehicle speed. The HMI apparatus 4 displays the driving assistance information in the form of an HMI relating to the accelerator OFF prompting assistance.

When the driver actually performs the accelerator operation OFF operation, the braking/driving force control unit 54c performs braking/driving force control to adjust the actual deceleration of the vehicle 2 to a prescribed accelerator OFF D range deceleration A_EngBrakeB. Meanwhile, the braking/driving force control unit 54c executes regenerative engine braking enlargement control such that regenerative engine braking is performed by the MG 6 in addition to the normal engine braking and so on. A timing and the like at which to execute the regenerative engine braking enlargement control can be calculated on the basis of the calculation result obtained by the engine braking enlargement determination unit 62.

Next, in step S122, the braking/driving force control unit 54c according to this embodiment calculates a timing at which to switch engine braking, or in other words a timing at which to switch the accelerator OFF deceleration, on the basis of the current vehicle speed V_now of the vehicle 2 and the remaining distance (L−Y) from the current position to the stopping position. The braking/driving force control unit 53c switches engine braking at a timing at which an inequality sign is established in (Equation 1) shown below, for example. In other words, the braking/driving force control unit 53c switches the accelerator OFF deceleration from the accelerator OFF D range deceleration A_engBrakeD to an accelerator OFF B range deceleration A_EngBrakeB. The braking/driving force control unit 54c then adjusts the actual deceleration of the vehicle 2 to the accelerator OFF B range deceleration A_EngBrakeB, whereupon a current control period is terminated and the routine shifts to a following control period.

[Math. 1]

$$V_{now} > V_b + \sqrt{V_{now}^2 - 2 \cdot A_{EngBrakeB} \cdot (L - X_b' - Y)}$$ (Equation 1)

In Equation 1, "V_now" denotes the current vehicle speed of the vehicle 2 following the accelerator operation OFF operation performed by the driver. "V_b" denotes the target brake operation starting vehicle speed. "A_EngBrakeB" denotes the accelerator OFF B range deceleration. "L" denotes the remaining distance to the reference stopping position from the current position at the actual timing of the accelerator operation OFF operation performed by the driver. "Y" denotes the estimated variation distance. In other words, "L−Y" denotes the remaining distance from the current position to the target stopping position. "X_b" denotes the target brake operation starting position.

The driving assistance apparatus 1 configured as described above, by displaying the accelerator OFF prompt in the location X_a', can provide prompting assistance in relation to the timing at which the driver is to perform the acceleration operation OFF operation such that the vehicle speed is at the target brake operation starting vehicle speed V_b when the vehicle 2 reaches the target brake operation starting position X_b'. Hence, the driving assistance apparatus 1 can prompt the driver appropriately such that when the driver actually performs a brake operation in order to stop in the target stopping position, the degree of deceleration requested in accordance with the brake operation corresponds to the optimum target brake deceleration A_brake, and as a result, a superior fuel efficiency improvement effect can be realized.

Further, as shown in FIG. 7, the driving assistance apparatus 1 configured as described above calculates the estimated variation distance Y, and provides stopping assistance using a deceleration pattern 102 obtained by shifting the target stopping position to the position closer to the vehicle 2 on the basis of the estimated variation distance Y. As a result, the vehicle 2 can be stopped using an appropriate deceleration pattern in which the stopping position is further toward the position closer to the vehicle 2 than is the stopping position of a deceleration pattern 100, in which the location P removed from the current position by the distance L is set as the stopping position, while continuing to use an identical target brake deceleration and an identical engine braking deceleration to the deceleration pattern 100.

Furthermore, by calculating the target travel condition quantity in consideration of the estimated variation distance, using the location of the reference target position (the distance L) in which the stop line or the like is disposed as a reference, the driving assistance apparatus 1 can perform a correction based on the reference target position.

The driving assistance apparatus 1 according to the embodiment described above can provide the driver with assistance in driving the vehicle 2 at an appropriate timing and in a comprehensible manner, and therefore driving assistance can be provided appropriately. As a result, eco-driving by the driver, for example, can be assisted appropriately, enabling a reduction in fuel consumption and an improvement in fuel efficiency.

Note that in the above description, the vehicle 2 is described as a hybrid vehicle, but the invention is not limited thereto, and the driving assistance apparatus 1 can also provide appropriate driving assistance to a conventional vehicle or an EV vehicle.

Figure 8:
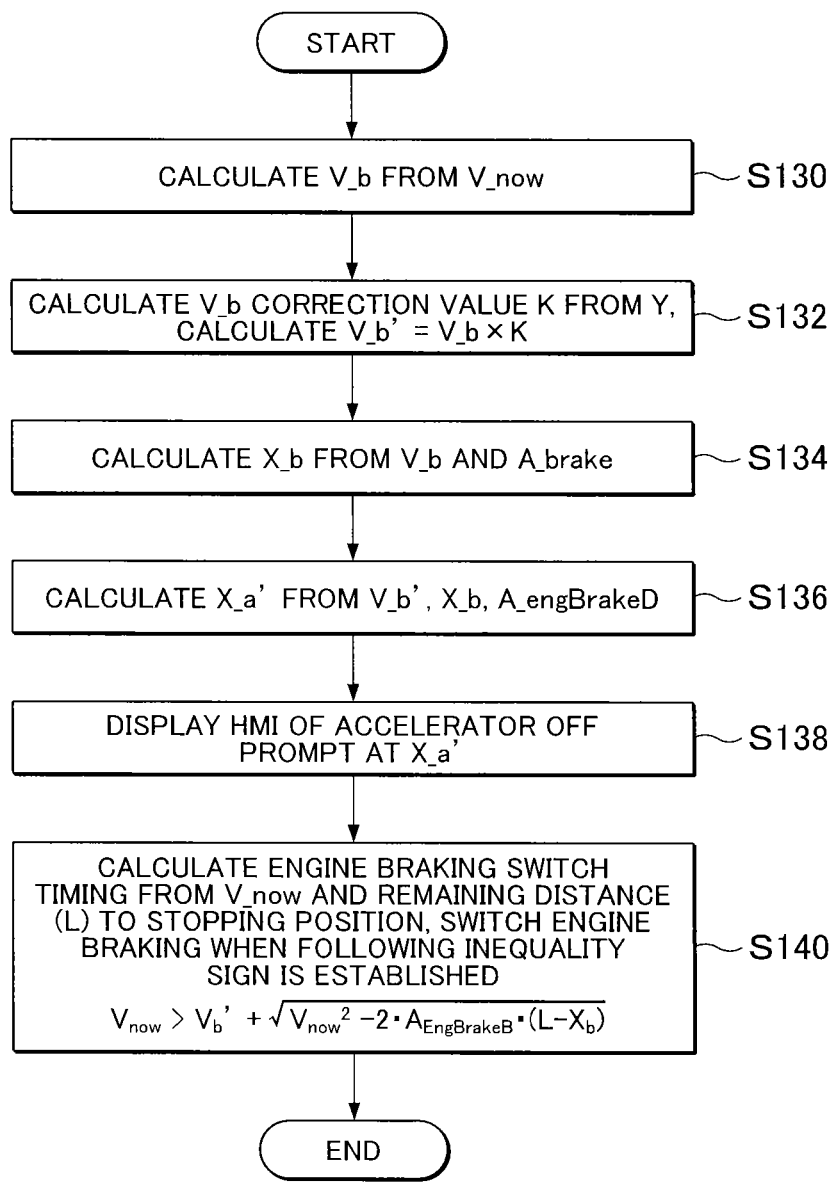
FIG. 8 is a flowchart showing another example of the control executed by the ECU.
Figure 9:
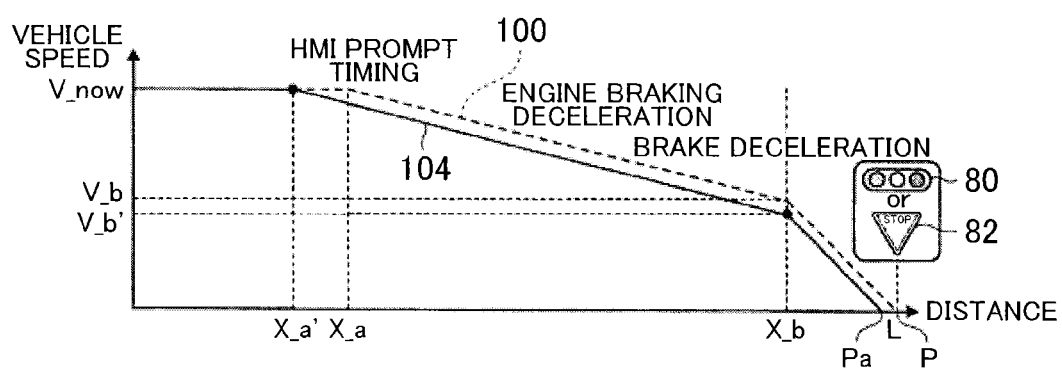
FIG. 9 is a schematic view showing another example of the relationship between the remaining distance to the stopping position and the vehicle speed and types of assistance in the vehicle control system.
Figure 10:
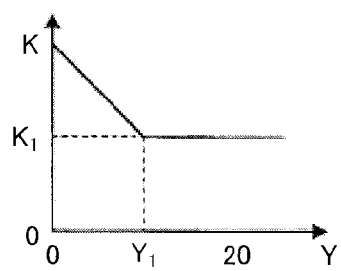
FIG. 10 is a graph showing an example of a relationship between a distance Y and a coefficient K.

Here, the method of varying the deceleration pattern using the estimated variation distance Y is not limited to the example shown in FIGS. 6 and 7. Another example of stopping assistance using the estimated variation distance will be described below using FIGS. 8 to 10. FIG. 8 is a flowchart showing an example of the control executed by the ECU. FIG. 9 is a schematic view showing an example of the relationship between the remaining distance to the stopping position and the vehicle speed and types of assistance in the vehicle control system. FIG. 10 is a graph showing an example of a relationship between the distance Y and a coefficient K.

As shown in FIGS. 8 and 9, first, in step S130, the target calculation unit 54b calculates the target brake operation vehicle speed V_b on the basis of the current vehicle speed (the entrance vehicle speed) V_now of the vehicle 2. The target calculation unit 54b calculates the target brake operation starting vehicle speed V_b by multiplying the vehicle speed V_now by the predetermined vehicle speed coefficient. The target brake operation starting vehicle speed V_b can be calculated using an identical method to that of the embodiment described above.

Next, in step S132, after setting the target brake operation starting vehicle speed V_b in step S130, the target calculation unit 54b calculates a V_b correction value K from the estimated variation distance Y, and then calculates a target brake operation starting vehicle speed corrected value V_b'=V_b× K. Here, as shown in FIG. 10, the V_b correction value K is a coefficient set in advance in relation to the estimated variation distance Y. Further, a relationship between the V_b correction value K and the estimated variation distance Y is set such that the V_b correction value K and the estimated variation distance Y increase in a proportional relationship up to a point at which the estimated variation distance Y reaches a predetermined value Y1, but when the estimated variation distance Y exceeds the predetermined value Y1, the V_b correction value K remains at a fixed value K1. Furthermore, K takes a smaller value than 1, and therefore the target brake operation starting vehicle speed corrected value V_b' takes a lower speed value than the target brake operation starting vehicle speed V_b.

After calculating the target brake operation starting vehicle speed corrected value V_b' in step S132, the target calculation unit 54b calculates the target brake operation starting position X_b, which serves as the predetermined location, in step S134 on the basis of the target brake operation starting vehicle speed V_b and the preset target brake deceleration A_brake. The target calculation unit 54b calculates the target brake operation starting position X_b on the basis of the target brake operation starting vehicle speed V_b and the target brake deceleration A_brake using the reference stopping position (a location removed from the current location by the distance L) as a reference position. In other words, the target calculation unit 54b back-calculates a brake operation starting position at which, when the vehicle 2 traveling at the target brake operation starting vehicle speed V_b is decelerated by the target brake deceleration A_brake through a brake operation, the vehicle 2 can be stopped in the target stopping position, and sets the calculation result as the target brake operation starting position X_b. Note that the target brake operation starting position X_b is identical to that of a case in which the reference stopping position is set as the target stopping position, or in other words the target brake operation starting position calculated using the deceleration pattern 100 of FIG. 9. The target brake deceleration A_brake takes an identical value to that of the embodiment described above.

After determining the target brake operation starting position X_b in step S134, the target calculation unit 54b calculates the accelerator OFF prompting position X_a' in step S136 on the basis of the target brake operation starting vehicle speed corrected value V_b', the target brake operation starting position X_b, and the preset prescribed accelerator OFF deceleration A_engBrakeD. The accelerator OFF deceleration A_engBrakeD takes an identical value to that of the embodiment described above.

The target calculation unit 54b calculates the accelerator OFF prompting position X_a' on the basis of the accelerator OFF deceleration A_engBrakeD and the target brake operation starting vehicle speed corrected value V_b' using the target brake operation starting position X_b as a reference position. In other words, the target calculation unit 54b back-calculates an accelerator operation OFF position at which, when the vehicle 2 is decelerated by the accelerator OFF deceleration A_engBrakeD, the vehicle speed of the vehicle 2 can reach the target brake operation starting vehicle speed corrected value V_b' in the target brake operation starting position X_b, and sets the calculation result as the accelerator OFF prompting position X_a'.

After calculating the accelerator OFF prompting position X_a' in step S136, the target calculation unit 54b starts the processing for outputting the driving assistance information using the HMI apparatus 4. In step S138, the target calculation unit 54b outputs driving assistance information relating to accelerator OFF prompting assistance to the HMI apparatus 4 at the timing at which the vehicle 2 reaches the accelerator OFF prompting position X_a' at the current vehicle speed. The HMI apparatus 4 displays the driving assistance information in the form of an HMI relating to the accelerator OFF prompting assistance. Further, similarly to the embodiment described above, when the driver actually performs the accelerator operation OFF operation, the braking/driving force control unit 54c performs braking/driving force control to adjust the actual deceleration of the vehicle 2 to the prescribed accelerator OFF D range deceleration A_engBrakeD.

Next, in step S140, the braking/driving force control unit 54c according to this embodiment calculates the timing at which to switch engine braking, or in other words the timing at which to switch the accelerator OFF deceleration, on the basis of the current vehicle speed V_now of the vehicle 2 and the remaining distance L from the current position to the reference stopping position. The braking/driving force control unit 53c switches engine braking at a timing at which an inequality sign is established in (Equation 2) shown below, for example. In other words, the braking/driving force control unit 53c switches the accelerator OFF deceleration from the accelerator OFF D range deceleration A_engBrakeD to the accelerator OFF B range deceleration A_EngBrakeB. The braking/driving force control unit 54c then adjusts the actual deceleration of the vehicle 2 to the accelerator OFF B range deceleration A_EngBrakeB, whereupon the current control period is terminated and the routine shifts to the following control period.

[Math. 2]

$$V_{now} > V_b' + \sqrt{V_{now}^2 - 2 \cdot A_{EngBrakeB} \cdot (L - X_b)}$$ (Equation 2)

In Equation 2, "V_now" denotes the current vehicle speed of the vehicle 2 following the accelerator operation OFF operation performed by the driver. "V_b'" denotes the target brake operation starting vehicle speed corrected value. "A_EngBrakeB" denotes the accelerator OFF B range deceleration. "L" denotes the remaining distance to the reference stopping position from the current position at the actual timing of the accelerator operation OFF operation performed by the driver. "X_b" denotes the target brake operation starting position.

The driving assistance apparatus 1 configured as described above, by displaying the accelerator OFF prompt in the location X_a', can provide prompting assistance in relation to the timing at which the driver is to perform the acceleration operation OFF operation such that the vehicle speed is at the target brake operation starting vehicle speed V_b when the vehicle 2 reaches the target brake operation starting position X_b'. Hence, the driving assistance apparatus 1 can prompt the driver appropriately such that when the driver actually performs a brake operation in order to stop in the stopping position, the degree of deceleration requested in accordance with the brake operation corresponds to the optimum target brake deceleration A_brake, and as a result, a superior fuel efficiency improvement effect can be realized.

Further, as shown in FIGS. 8 and 9, the driving assistance apparatus 1 configured as described above calculates the estimated variation distance Y and corrects the target brake operation starting vehicle speed V_b to the target brake operation starting vehicle speed corrected value V_b' in accordance with the estimated variation distance Y, whereby the vehicle speed upon arrival at the target brake operation starting position X_b can be reduced. As a result, the driver starts to decelerate the vehicle 2 at the optimum target brake deceleration A_brake in the target brake operation starting position X_b, and is therefore able to stop in front of the reference stopping position. In other words, as shown by a deceleration pattern 104, by setting the target brake operation starting vehicle speed corrected value V_b', the vehicle 2 can be stopped before the stopping position of the deceleration pattern 100 using an appropriate deceleration pattern.

In the above embodiment, the target brake operation starting vehicle speed corrected value V_b' is calculated by correcting the target brake operation starting vehicle speed V_b on the basis of the estimated variation distance Y, but the invention is not limited thereto. The target calculation unit 54b calculates the target brake operation starting position X_b serving as the predetermined location on the basis of the target brake operation starting vehicle speed V_b and the preset target brake deceleration A_brake using the reference stopping position as a reference position. The target calculation unit 54b may also set a speed at which the vehicle 2 stops in a location removed from the current location by the distance L−Y after decelerating from the target brake operation starting position X_b at the target brake deceleration A_brake as the target brake operation starting vehicle speed corrected value on the basis of the target brake deceleration A_brake and the target brake operation starting position X_b using a target stopping position (a location removed from the current location by the distance L−Y) corresponding to the remaining distance as a reference.

Figure 11:
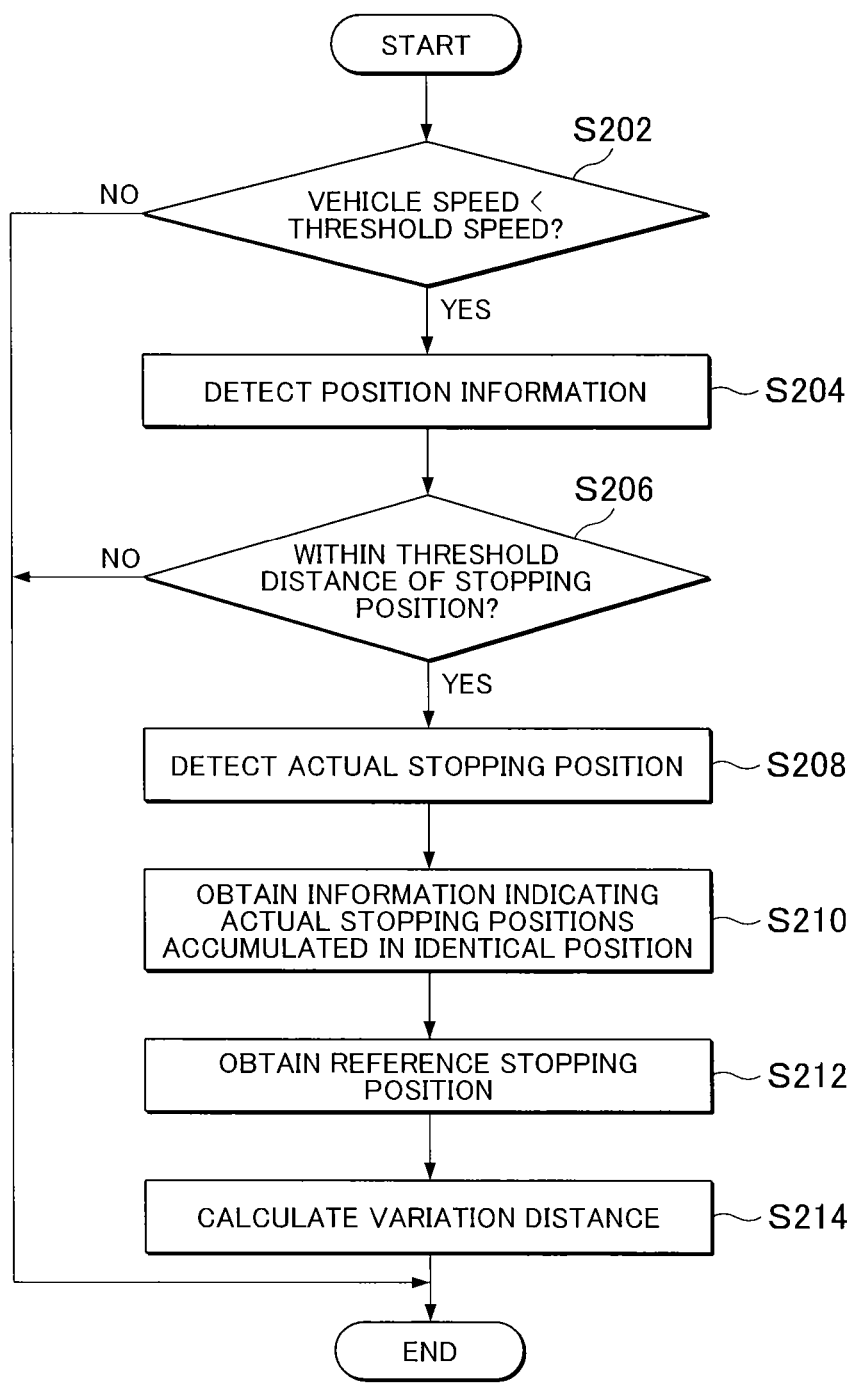
FIG. 11 is a flowchart showing an example of the control executed by the ECU.

Next, using FIGS. 11 and 12, a method of calculating the estimated variation distance Y will be described. Here, FIG. 11 is a flowchart showing an example of the control executed by the ECU, and FIG. 12 is an illustrative view showing examples of stopping patterns of the vehicle. Note that processing shown in FIG. 11 may be performed by the respective units of the ECU 50, specifically the first information calculation unit 51, the second information calculation unit 52, and the third information calculation unit 53. Alternatively, the ECU 50 may include a separate calculation unit that determines the variation distance Y. Further, the ECU 50 executes the processing shown in FIG. 11 repeatedly during travel.

In step S202, the ECU 50 determines whether or not vehicle speed<threshold speed is established. Here, the threshold speed is a speed at which the vehicle 2 is considered stationary. The vehicle speed can be obtained from the detection result of the vehicle speed sensor 10. After determining in step S202 that vehicle speed<threshold speed is not established (No), the ECU 50 terminates the processing.

After determining in step S202 that vehicle speed<threshold speed is established (Yes), the ECU 50 detects position information in step S204. The position information can be obtained from the detection result of the GPS apparatus 13. After detecting the position information in step S204, the ECU 50 determines whether or not the vehicle 2 is within a threshold distance of the stopping position in step S206. In other words, the ECU 50 determines whether or not the vehicle 2 is within a fixed distance from the stop line or the like set as the reference stopping position. Note that the ECU 50 preferably determines whether or not the stopping position exists within a fixed distance in front of the vehicle 2 in an advancement direction. After determining in step S206 that the vehicle 2 is not within the threshold distance of the stopping position (No), the ECU 50 terminates the processing.

After determining in step S206 that the vehicle 2 is within the threshold distance of the stopping position (Yes), the ECU 50 detects an actual stopping position in step S208. In other words, the ECU 50 detects a stopping position on the position closer to the vehicle 2 than is the reference position. After detecting the actual stopping position in step S208, the ECU 50 obtains information indicating accumulated actual stopping positions relating to the same position in step S210. In other words, the ECU 50 obtains data indicating actual stopping positions detected in the past in relation to the same reference stopping position.

After obtaining the data indicating the accumulated actual stopping positions in step S210, the ECU 50 obtains information relating to the reference stopping position in step S212, calculates the estimated variation distance Y in step S214, and after setting the calculated variation distance as the variation distance of the corresponding stopping position, terminates the processing.

As shown in FIG. 12, for example, in a region in which the temporary stop sign 82 is disposed, a reference stopping position 120 is set in the location P. Note that the reference stopping position 120 is a position of a stop line, for example. Further, in the example of FIG. 12, six deceleration patterns (stopping patterns) 122, 124, 126, 128, 130, 132 are detected as stopping operations performed in relation to the reference stopping position 120. In the deceleration pattern 122, the vehicle 2 stops in the location P serving as the reference stopping position 120. In the deceleration pattern 124, the vehicle 2 initially stops in a location $P_1$ and then stops in the location P serving as the reference stopping position 120. In the deceleration pattern 126, the vehicle 2 initially stops in a location $P_2$ and then stops in the location P serving as the reference stopping position 120. In the deceleration pattern 128, the vehicle 2 initially stops in a location $P_3$ and then stops in the location P serving as the reference stopping position 120. In the deceleration pattern 130, the vehicle 2 initially stops in a location $P_4$ and then stops in the location P serving as the reference stopping position 120. In the deceleration pattern 132, the vehicle 2 initially stops in a location $P_5$ and then stops in the location P serving as the reference stopping position 120.

The ECU 50, having detected the six deceleration patterns (stopping patterns) 122, 124, 126, 128, 130, 132, accumulates information indicating the six locations P, $P_1$, $P_2$, $P_3$, $P_4$, $P_5$ as actual stopping positions. Note that in the example shown in FIG. 12, the location P serving as the reference stopping position 120 is a position of a temporary stop, and therefore the respective stops in the location P in the deceleration patterns 124, 126, 128, 130, 132 are not detected as actual stopping positions.

The ECU 50 calculates the variation distance Y on the basis of the information indicating the accumulated actual stopping positions detected in the manner described above. For example, the ECU 50 calculates a location $P_A$ serving as an average value of the actual stopping positions, and sets a distance between the average value location $P_A$ and an actual stopping position $P_F$ furthest from the reference stopping position P as the variation distance Y. In other words, $L=|P_A-P_F|$ is set. Note that in this embodiment, the actual stopping position $P_F$ corresponds to the location $P_5$.

Further, the ECU 50 calculates a location $P_C$ serving as a median value of the actual stopping positions, and sets a distance between the median value location $P_C$ and the actual stopping position $P_F$ furthest from the reference stopping position P as the variation distance Y. In other words, $L=|P_C-P_F|$ is set. The median value location $P_C$ is an intermediate location between an actual stopping position closest to the reference stopping position and the actual stopping position furthest from the reference stopping position. In this embodiment, the median value location $P_C$ is set as an intermediate location between the actual stopping position P of the deceleration pattern 122 and the actual stopping position $P_F$ of the deceleration pattern 132.

Note that the method of calculating the variation distance Y is not limited to the method described above, and instead, a standard deviation of the actual stopping positions may be calculated, whereupon a standard deviation σ or a distance corresponding to 3σ is set as the variation distance Y. Furthermore, the ECU 50 may set a distance from the reference stopping position to the median value location $P_C$ as the variation distance Y.

Hence, by determining the variation distance on the basis of the information indicating past actual stopping positions, varying the target travel condition quantity on the basis of the variation distance, and varying the start timing of the stopping assistance accordingly, the driving assistance apparatus 1 can provide the driver with more favorable stopping assistance.

Further, by calculating the estimated variation distance Y using the location of the reference target position (the distance L) in which the stop line or the like is disposed as a reference, the driving assistance apparatus 1 can perform a correction based on the reference target position. As a result, a situation in which stopping assistance is provided in a different location to the location where the vehicle 2 must actually stop can be prevented. For example, a situation in which a stop on a road that is constantly congested or the like is detected as an actual stopping position such that stopping assistance is executed in a location that is not a position where the vehicle 2 must stop can be suppressed.

Figure 13:
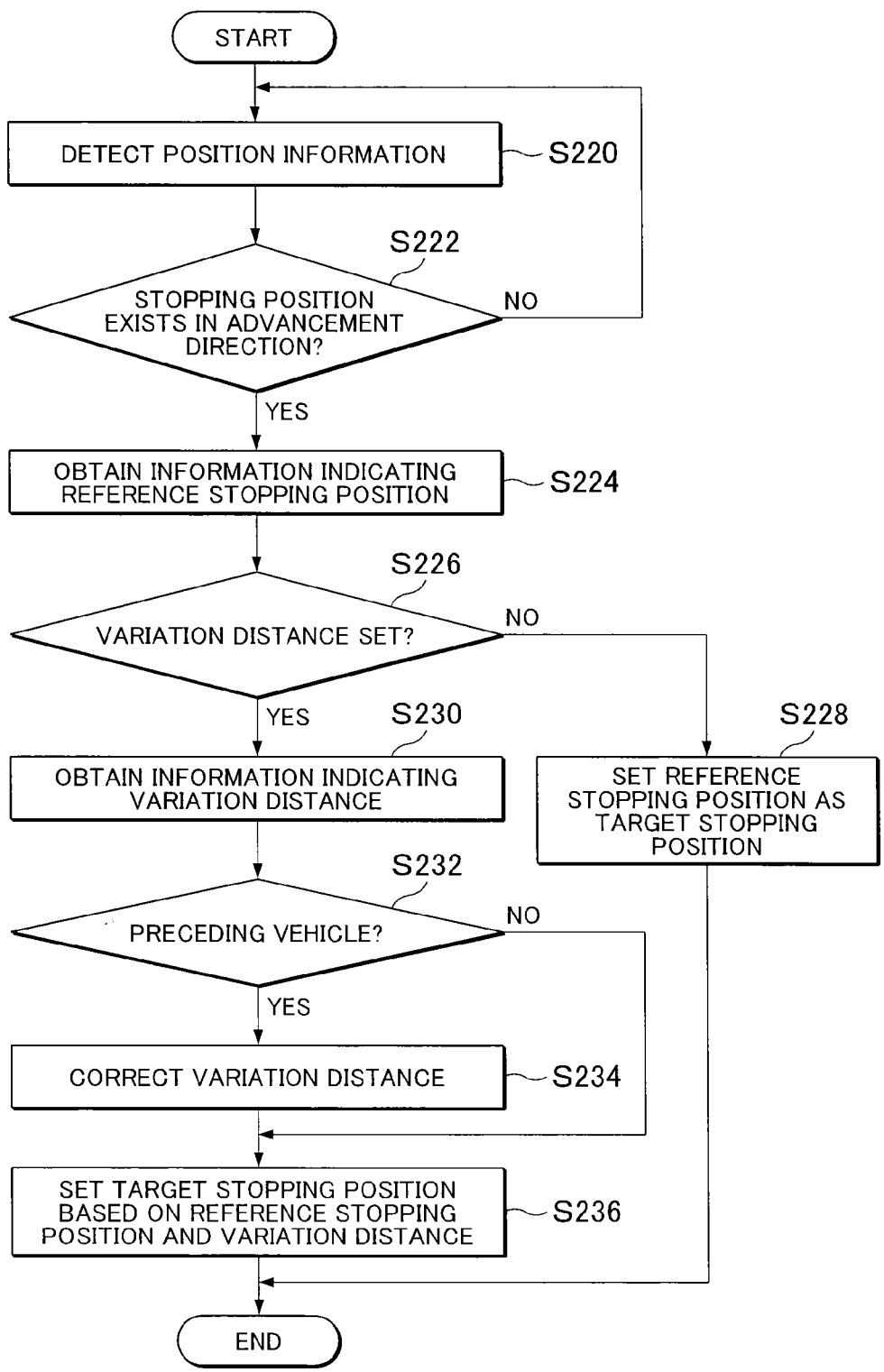
FIG. 13 is a flowchart showing an example of the control executed by the ECU.

Next, using FIG. 13, processing performed to read the variation distance Y set in the processing shown in FIG. 11 during the stopping assistance will be described. Here, FIG. 13 is a flowchart showing an example of the control executed by the ECU. Note that the processing shown in FIG. 13 can be realized by processing performed in conjunction by the plurality of calculation units of the ECO 50. Further, the processing shown in FIG. 13 is an example of a case in which the target stopping position is varied on the basis of the variation distance Y, but similar processing can be executed in a case where a brake starting target speed is varied on the basis of the variation distance Y.

The ECU 50 detects the position information in step S220, and determines whether or not a stopping position exists in the advancement direction in S222. Here, as described above, the stopping position includes a position of a red traffic light and a position of a temporary stop. Further, the ECU 50 uses a range of a fixed distance as a subject. After determining that a stopping position does not exist (No) in step S222, the ECU 50 advances to S220 and executes the processing of step S220 again.

After determining that a stopping position exists (Yes) in step S222, the ECU 50 obtains the information indicating the reference stopping position in step S224, and determines whether or not the variation distance has been set in step S226. In other words, the ECU 50 determines whether or not a variation distance calculation result is associated with the reference stopping position obtained in step S224. After determining that the variation distance has not been set (No) in step S226, the ECU 50 sets the reference stopping position as the target stopping position in step S228, and then terminates the processing.

After determining that the variation distance has been set (Yes) in step S226, the ECU 50 obtains the information indicating the variation distance in step S230, and then determines whether or not a preceding vehicle exists in step S232. Note that the presence of a preceding vehicle may be determined on the basis of the detection value of the millimeter wave sensor 16. Further, the ECU 50 determines that a preceding vehicle exists when the preceding vehicle exists within a fixed distance, and determines that a preceding vehicle does not exist when the preceding vehicle exists beyond the fixed distance or a preceding vehicle is not detected. After determining that a preceding vehicle does not exist (No) in step S232, the ECU 50 advances to step S236.

After determining that a preceding vehicle exists (Yes) in step S232, the ECU 50 corrects the variation distance in step S234, and then advances to step S236. Here, when a preceding vehicle exists, the ECU 50 performs processing to lengthen the variation distance. In so doing, it is possible to respond to a situation in which a preceding vehicle exists such that the stopping position shifts to the position closer to the vehicle 2.

After determining No in step S232 or after executing the processing of step S234, the ECU 50 sets the target stopping position on the basis of the reference stopping position and the estimated variation distance, or in other words sets the target stopping position as L−Y, in step S236, and then terminates the processing.

As shown in FIG. 13, by detecting the variation distance set in relation to the stopping position and performing the processing described above, the driving assistance apparatus 1 can obtain the effects described above.

In the processing of FIG. 13, by correcting the variation distance on the basis of whether or not a preceding vehicle exists, or in other words by performing the processing of steps S232 and S234, the variation distance can be corrected in accordance with conditions during actual travel, and as a result, the stopping assistance can be improved in precision. Note that the variation distance does not necessarily have to be corrected on the basis of whether or not a preceding vehicle exists.

Figures 14, 15:
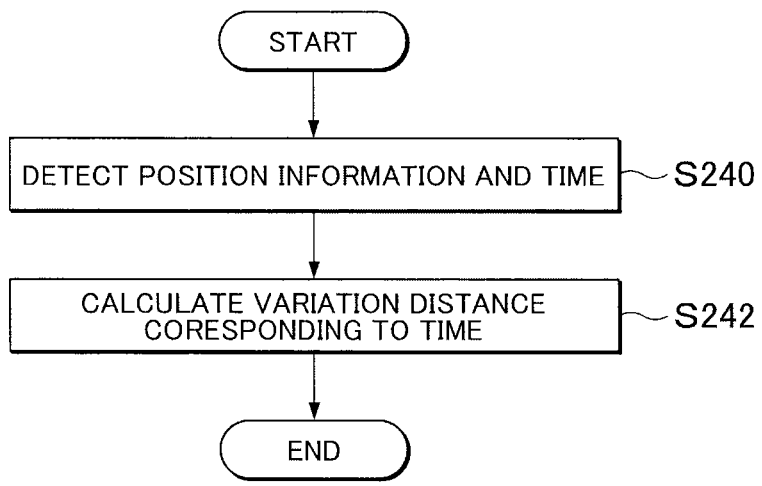
FIG. 14 is an illustrative view showing an example of a relationship between an estimated variation distance and time.
FIG. 15 is a flowchart showing an example of the control executed by the ECU.

Here, the driving assistance apparatus 1 may be configured to vary the estimated variation distance set for each stopping position further in time zone intervals. FIG. 14 is an illustrative view showing an example of a relationship between the estimated variation distance and time, and FIG. 15 is a flowchart showing an example of the control executed by the ECU.

As shown in FIG. 14, the driving assistance apparatus 1 calculates the variation distance by accumulating the information indicating the actual stopping positions in respective time zones of a single day. In the example shown in FIG. 14, a single day is divided into six time zones, and variation distances calculated on the basis of the actual stopping positions detected in the respective time zones are stored.

In this case, the ECU 50 performs processing shown in FIG. 15 when executing step S230 of FIG. 13. More specifically, the ECU 50 detects the position information and the time in step S240, calculates a variation distance corresponding to the time in step S242, and then terminates the processing. In other words, the ECU 50 specifies the subject stopping position on the basis of the position information, and then obtains a table such as that shown in FIG. 14 set in relation to the specified stopping position. The ECU 50 then obtains the corresponding variation distance on the basis of the obtained table and the time information.

By modifying the variation distance in accordance with the time zone in this manner, the driving assistance apparatus 1 can calculate and set a variation distance that corresponds to an amount of traffic, which varies according to the time zone. As a result, stopping assistance can be performed in accordance with the time zone.

Note that in FIGS. 14 and 15, the estimated variation distance is varied by dividing a single day into periods of several hours. The invention is not limited thereto, however, and the time may be divided into days of the week or weekdays and weekends.

The driving assistance apparatus according to the embodiments of the invention described above is not limited to the above embodiments, and may be subjected to various modifications within the scope of the claims. The driving assistance apparatus according to these embodiments may be configured by appropriately combining constituent elements of the respective embodiments described above.

In the above description, the ECU 50 doubles as an assistance control apparatus and a deceleration control apparatus, but the invention is not limited thereto, and instead, for example, the assistance control apparatus and the deceleration control apparatus may be configured separately to the ECU 50 and configured to exchange information such as detection signals, drive signals, and control commands.

In the above description, the target travel condition quantity is the target brake operation starting vehicle speed, which is a recommended vehicle speed at which the driver is recommended to perform the brake operation (the braking request operation). The invention is not limited thereto, however, and any target condition quantity representing a travel condition of the vehicle, for example a target vehicle acceleration/deceleration, a target shift ratio (a target gear position), a target operating angle, and so on, may be used instead.

In the above description, the recommended driving operation in relation to which the driving assistance apparatus provides the driver with prompting assistance, or in other words the operation assisted by the driving assistance apparatus, is the accelerator operation OFF operation (the operation for canceling the acceleration request operation) performed by the driver. The invention is not limited thereto, however, and the recommended driving operation in relation to which the driving assistance apparatus provides the driver with prompting assistance may, for example, be the acceleration request operation, the braking request operation, the operation for canceling the braking request operation, a shift operation, a steering operation, and so on.

In the above description, the driving assistance apparatus outputs visual information as the driving assistance information, but the invention is not limited thereto, and instead, for example, the driving assistance apparatus may output audio information, sensory information, and so on as the driving assistance information, and the form of the audio information or sensory information may be varied appropriately.

Furthermore, the driving assistance apparatus 1 according to this embodiment uses the millimeter wave sensor 16 as preceding vehicle detecting means for detecting a preceding vehicle (a frontward vehicle), but the invention is not limited thereto, and a camera that obtains images ahead of the vehicle 2 may be used as the preceding vehicle detecting means. In this case, the driving assistance apparatus 1 may analyze an image obtained by the camera in order to detect a preceding vehicle in front of the vehicle 2 in the advancement direction.

1 driving assistance apparatus
2 vehicle
3 vehicle control system
4 HMI apparatus (assistance apparatus)
5 engine (internal combustion engine)
6 MG (motor)
13 GPS apparatus
14 wireless communication apparatus
15 DB
50 ECU (assistance control apparatus, deceleration control apparatus)
51 first information calculation unit
52 second information calculation unit
53 third information calculation unit
54 vehicle control unit
55 CAN
60 accelerator OFF prompting HMI determination unit
62 engine braking enlargement determination unit
64 engine early OFF determination unit
66 driver model calculation unit
68 engine ON/OFF determination unit

The invention claimed is:
1. A driving assistance apparatus assisting driving of a vehicle, the driving assistance apparatus comprising:
an assistance control apparatus configured to
accumulate vehicle stopping position information, indicating actual stopping positions at which the vehicle stops in relation to a reference stopping position, calculate an estimated variation distance as a function of each of the actual stopping positions with respect to the reference stopping position based on the accumulated vehicle stopping position information, and create a target vehicle travel condition in which a stopping assistance timing is varied based on the estimated variation distance, the stopping assistance timing being a timing at which stopping assistance is started; and an assistance apparatus that outputs, based on the target vehicle travel condition created by the assistance control apparatus, driving assistance information to assist driving of the vehicle, wherein the assistance apparatus performs assistance to prompt a recommended driving operation by outputting the driving assistance information, and the driving assistance information includes information instructing cancelation of an acceleration request operation.

2. The driving assistance apparatus according to claim 1, wherein the assistance control apparatus is configured to vary the stopping assistance timing by determining a target stopping position based on a difference between the estimated variation distance and the reference stopping position, and creating the target vehicle travel condition based on the target stopping position.

3. The driving assistance apparatus according to claim 1, wherein the assistance control apparatus is configured to vary the stopping assistance timing by correcting a target vehicle speed at a start of a braking request operation based on the estimated variation distance, and to create the target vehicle travel condition based on the corrected target vehicle speed at the start of the braking request operation.

4. The driving assistance apparatus according to claim 1, wherein the estimated variation distance is a distance from a median position of the actual stopping positions to the furthest one of the actual stopping positions from the reference stopping position.

5. The driving assistance apparatus according to claim 1, wherein the estimated variation distance is a distance from a medium median position of the actual stopping positions to the furthest one of the actual stopping positions from the reference stopping position.

6. The driving assistance apparatus according to claim 1, wherein the assistance control apparatus is configured to set a target stopping position to a position shifted, by the estimated variation distance, to a position closer to the vehicle than is the reference stopping position.

7. The driving assistance apparatus according to claim 1, further comprising preceding vehicle detecting means for detecting a preceding vehicle traveling in front of the vehicle in an advancement direction of the vehicle, wherein, when the preceding vehicle detecting means detects a preceding vehicle, the assistance control apparatus is configured to advance the stopping assistance timing.

8. The driving assistance apparatus according to claim 7, wherein when the preceding vehicle detecting means detects the preceding vehicle, the assistance control apparatus is configured to shift the target stopping position to a position closer to the vehicle than is the reference stopping position.

9. The driving assistance apparatus according to claim 1, wherein the assistance control apparatus is configured to classify the information indicating the actual stopping positions into set time patterns and to calculate the estimated variation distance for each of the time patterns, and the assistance control apparatus is configured to create the target vehicle travel condition based on the estimated variation distance of one of the time patterns in which a creation time of the target vehicle travel condition is classified.

10. The driving assistance apparatus according to claim 1, wherein the driving assistance information includes information instructing cancelation of a braking request operation.

11. The driving assistance apparatus according to claim 1, wherein the driving assistance information includes information instructing starting of a braking request operation.

12. The driving assistance apparatus according to claim 1, further comprising a preceding vehicle detecting unit that is configured to detect a preceding vehicle traveling in front of the vehicle in an advancement direction of the vehicle, wherein, when the preceding vehicle detecting unit detects a preceding vehicle, the assistance control apparatus advances the stopping assistance timing.

13. The driving assistance apparatus according to claim 12, wherein when the preceding vehicle detecting unit detects the preceding vehicle, the assistance control apparatus is configured to shift the target stopping position to a near side with respect to the reference stopping position.

14. The driving assistance apparatus according to claim 1, wherein the target stopping position is shifted to a position closer to the vehicle than the reference stopping position is when the estimated variation distance increases.

15. The driving assistance apparatus according to claim 1, wherein the vehicle stopping position information is learned information from prior driving of the vehicle.

16. The driving assistance apparatus according to claim 1, wherein the vehicle stopping position information is stored in a database, and the assistance control apparatus is configured to accumulate the vehicle stopping information into the database.

17. The driving assistance apparatus according to claim 16, wherein the database stores a plurality of reference stopping positions, and the vehicle stopping position information corresponds to respective and distinct reference stopping positions.

18. The driving assistance apparatus according to claim 16, wherein the vehicle stopping position information is accumulated according to respective time zones.

19. A driving assistance apparatus assisting driving of a vehicle, the driving assistance apparatus comprising:

an assistance control apparatus configured to
  accumulate vehicle stopping position information, indicating actual stopping positions in which the vehicle stops in relation to a reference stopping position,
  calculate an estimated variation distance as a function of each of the actual stopping positions with respect to the reference stopping position based on the accumulated vehicle stopping position information, and
  create a target vehicle travel condition in which a stopping assistance timing is varied based on the estimated variation distance, the stopping assistance timing being a timing at which stopping assistance is started; and an assistance apparatus that outputs, based on the target vehicle travel condition created by the assistance control apparatus, driving assistance information to assist driving of the vehicle, wherein the assistance control apparatus is configured to vary the stopping assistance timing by correcting a target vehicle speed at a start of a braking request operation based on the estimated variation distance, and to create the target vehicle travel condition based on the corrected target vehicle speed at the start of the braking request operation.

* * * * *